(12) United States Patent
Almeida

(10) Patent No.: US 8,140,384 B2
(45) Date of Patent: *Mar. 20, 2012

(54) ADVERTISING REVENUE SHARING

(75) Inventor: John Almeida, Richmond, CA (US)

(73) Assignee: UnoWeb, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/157,291

(22) Filed: Jun. 9, 2011

(65) Prior Publication Data

US 2011/0238501 A1    Sep. 29, 2011

Related U.S. Application Data

(63) Continuation-in-part of application No. 12/817,755, filed on Jun. 17, 2010, now Pat. No. 7,987,139, and a continuation of application No. 12/504,555, filed on Jul. 16, 2009, now abandoned, which is a continuation of application No. 11/677,242, filed on Feb. 21, 2007, now Pat. No. 7,580,858.

(51) Int. Cl.
*G06Q 30/00* (2006.01)

(52) U.S. Cl. .......................................... 705/14; 705/52

(58) Field of Classification Search .................. 705/14, 705/52
See application file for complete search history.

(56) References Cited

U.S. PATENT DOCUMENTS

| 2005/0028188 A1* | 2/2005 | Latona et al. .................. 725/13 |
| 2006/0282328 A1* | 12/2006 | Gerace et al. .................. 705/14 |
| 2009/0313113 A1* | 12/2009 | Dye et al. .................. 705/14.42 |

* cited by examiner

*Primary Examiner* — Pierre E Elisca

(74) *Attorney, Agent, or Firm* — Louis Ventre, Jr.

(57) ABSTRACT

A method of host development is based on paying the writer of free content through advertising revenue sharing. Steps include receiving an advertisement, which is paid content, from an advertiser; receiving non-paid content subject to a condition that the provider may receive no compensation for the non-paid content; combining the paid content and the non-paid content on a content page; registering a user to interact with the content page; sending the content page for display on a computer operated by the user; calculating a number equaling all interactions of the user with the paid content; receiving payment from the advertiser for said number; and paying the provider based on a fraction of the payment.

19 Claims, 17 Drawing Sheets

ADVERTISING REVENUE SHARING

CROSS-REFERENCE TO RELATED APPLICATIONS

This application is a continuation-in-part of pending U.S. application Ser. No. 12/817,755 filed 17 Jun. 2010, which is a continuation of U.S. application Ser. No. 12/504,555, filed 16 Jul. 2009, which is a continuation of application Ser. No. 11/677,242, filed 21 Feb. 2007 that issued as U.S. Pat. No. 7,580,858 on 25 Aug. 2009, all of which are hereby incorporated by reference herein.

TECHNICAL FIELD

In the field of data processing, and involving financial, business practice, and management, a method of revenue sharing between the content provider/writer, website hosting the content and the user clicking on the advertisings associated with said content and content distributor, or by buying paid content (e-commerce or e-services) associated with the content.

BACKGROUND ART

Currently, content writers prepare and submit content that is voluntarily contributed to a host and integrated onto a blog-portal, virtual community and others. The content writer does all the intellectual work and the host inserts advertisings and other paid content along the user-provided content without compensating the content writer, who is intellectual-proprietor.

On the other hand, users viewing those contents more often than not, click on the paid content and as with the content writer, the users are not compensated for their click.

In the case of RSS (Really Simple Syndication) writers provide the content along with other advertising or paid content and the site presenting the content helps generate the content provider's revenue, and again, without the user interacting with the paying content or the content provider receiving any compensation for the generated revenue.

The disclosed method of revenue sharing compensates all parties that are involved in the process of interacting with paid content and helping generate revenues.

SUMMARY OF INVENTION

A method of web site development is based on paying the writer or provider of free substantive content through advertising revenue sharing. A first step is receiving an advertisement, which is paid content, from an advertiser.

A second step is receiving non-paid content subject to a condition that the provider may receive no compensation for the non-paid content. Non-paid content is typically substantive content from a provider, who is the writer. The writer essentially makes a contribution of written material.

A third step includes combining the paid content and the non-paid content on a content page, which is what the host does with the intent of displaying both the substantive content (non-paid content) and the advertisement to a user. It is also what a content-for-sale associate does with the non-paid content.

Other steps include: registering a user to interact with the content page, which allows the host to track what the user does after viewing the content page; sending the content page for display on a computer operated by the user; calculating a number equaling all interactions of the user with the paid content; receiving payment from the advertiser for said number; and paying the provider based on a fraction of the payment. The payment made to the provider compensates the provider as the writer but such payment is made only receipt of revenue by the host, for example, if an advertiser payment is received, or if a sales commission for the paid content is received. So, instead of no compensation as is common, the provider may receive payment if there is advertising revenue or sales commission revenue. Also, the provider may receive no payment if there are no revenues.

Optional steps include: enabling the user to suggest paid content that is related to the non-paid content; setting a maximum number of times that paid content can be displayed to the user; paying the user for revenues generated by the user's own interactions; and setting a minimum time period which must elapse before redisplaying a previously displayed advertising on a content page to the user.

An alternative embodiment requires elapse of a minimum time period before a user who clicks on an advertisement will generate a charge to an advertiser. The steps include: registering a provider to prepare free content subject to a condition that the provider may receive no compensation for the non-paid content; receiving paid content; combining the free content with the paid content on a content page; sending the content page for display on a computer; enabling a user to access the computer and display the content page; calculating a gross total of times the user displays the content page; determining a net total by subtracting from the gross total the number of subsequent times the user accesses the content page before expiration of a waiting-time threshold from an immediately preceding access; receiving payment from the advertiser for the net total; and paying the provider for the net total.

Another alternative embodiment is a method of web site development based on advertising revenue sharing and includes a limitation on how many clicks are counted if they occur too fast. The steps include: providing a server computer; combining content with an advertisement; sending the content and advertisement to a user accessing the server computer; receiving at the server computer a first click on the advertisement, the first click sent by the user; saving a first indication of receiving the first click; receiving a second click on the advertisement, the second click sent by the user; setting a time period; determining if the second click is received after expiration of the time period; saving a second indication of the second click if the second click occurs after expiration of the time period; and charging an advertiser for each saved indication. Optional steps include: providing a clickable link to paid content from a content distributor on the server computer; paying the content distributor for each click on the clickable link to the paid content; receiving the content from a provider subject to a condition that the provider may receive no compensation for the non-paid content; and paying the provider for each click on the clickable link to the paid content.

A third alternative embodiment is a method of host development based on advertising revenue sharing and specifies that the paid content contains a link to another site. The steps include: registering a provider to prepare non-paid content subject to a condition that the provider may receive no compensation for the non-paid content; transmitting the non-paid content to a content distributor; receiving at a host the non-paid content sent by the content distributer and paid content from an advertiser, the paid content comprising a link to additional information; combining the non-paid content and the paid content into a page; displaying the page on the host; totaling a number of interactions by a user with the link;

receiving payment from the advertiser for the number of interactions with the link; and paying the provider for the number of interactions with the link. Optional steps include: paying the content distributor for the number of interactions with the link; and incorporating the non-paid content into the page as virtual content.

TECHNICAL PROBLEM

With the explosion of ways for presenting online content over the Internet, there are a number of content hosting sites like, but not limited to: blogs, RSS (Really Simple Syndicate), virtual communities, photo sharing sites, video sharing sites, etc. These hosting environments offer means for their user base to place and view contents, the hosting environment in turn places paid contents inserted into the user provided contents or along with, without any kind of compensation whatsoever for the content provider nor to any other involved party taking part in generating the income.

Currently, there is no fair and just mechanism for compensating all of the involved parties helping in the generating of the income stream for the hosting site, content provider and user (user is the one who reads, views and clicks over the paid content, or one who is a buyer who buys goods or services associated with the non-paid content, henceforth called user, viewer or clicker and herein such terms are used interchangeably).

Current methods involving creation of content on the web, those doing intellectual work, commonly known as content provider or content contributors/writers and users doing the clicking over the paid content, do not get compensated. The content hosting site places paid content along with user provided content without creating any fair means for compensating those who help generate the revenue stream.

ADVANTAGEOUS EFFECTS OF INVENTION

The method fosters content creation and content use by providing a methodology for compensating formerly uncompensated writers and consumers or users of the content.

The method is a means to increase the number of intellectual contributors, readers and content-hosting sites. The content provider's (content writer's) objective is to have the content placed in the greatest possible number of web sites and the broadest possible exposure to the content's intellect message. Since the Internet is becoming a universal virtual grid where content is hosted in one location (dynamic) and virtually presented at many other locations (the physical hosting is done by the dynamic hosting site and the virtual hosting site does the presentation to a user without processing the actual content). By having a mechanism to compensate the hosting-site (dynamically/virtually), the content writers and the clicker as well, a broad base of high quality content will be available for the creation of specialized virtual content hosting sites and portals, thus benefiting everyone along the way. The virtual presentation can be done from a single location or over the Internet by the use of web controls technology The method provides a financial incentive that meets advertiser goals of having as broad exposure as possible to the greatest possible number of viewers. It also provides a financial incentive that meets advertising-distributors goals to have the highest paying per-click customers and the broadest possible user-base.

The method avoids overcharging the advertiser by providing participating parties with compensation for their time and efforts. The method provides a fair and just process for compensating those involved in creating the income stream so that the income stream, if any, is fairly divided among content contributors, hosting sites and users doing the clicking on the paid content.

The method enables building the next generation of a universal virtual media. This method can work individually by paying commission only to the contributor (provider), paying commission only to the website or paying commission only to the clicker or any combination thereof.

BRIEF DESCRIPTION OF DRAWINGS

The accompanying drawings, which are incorporated in the form a part of this specification, illustrate embodiments of the invention and, together with the description, serve to explain the principles of the invention.

DESCRIPTION OF EMBODIMENTS

Figure 1:
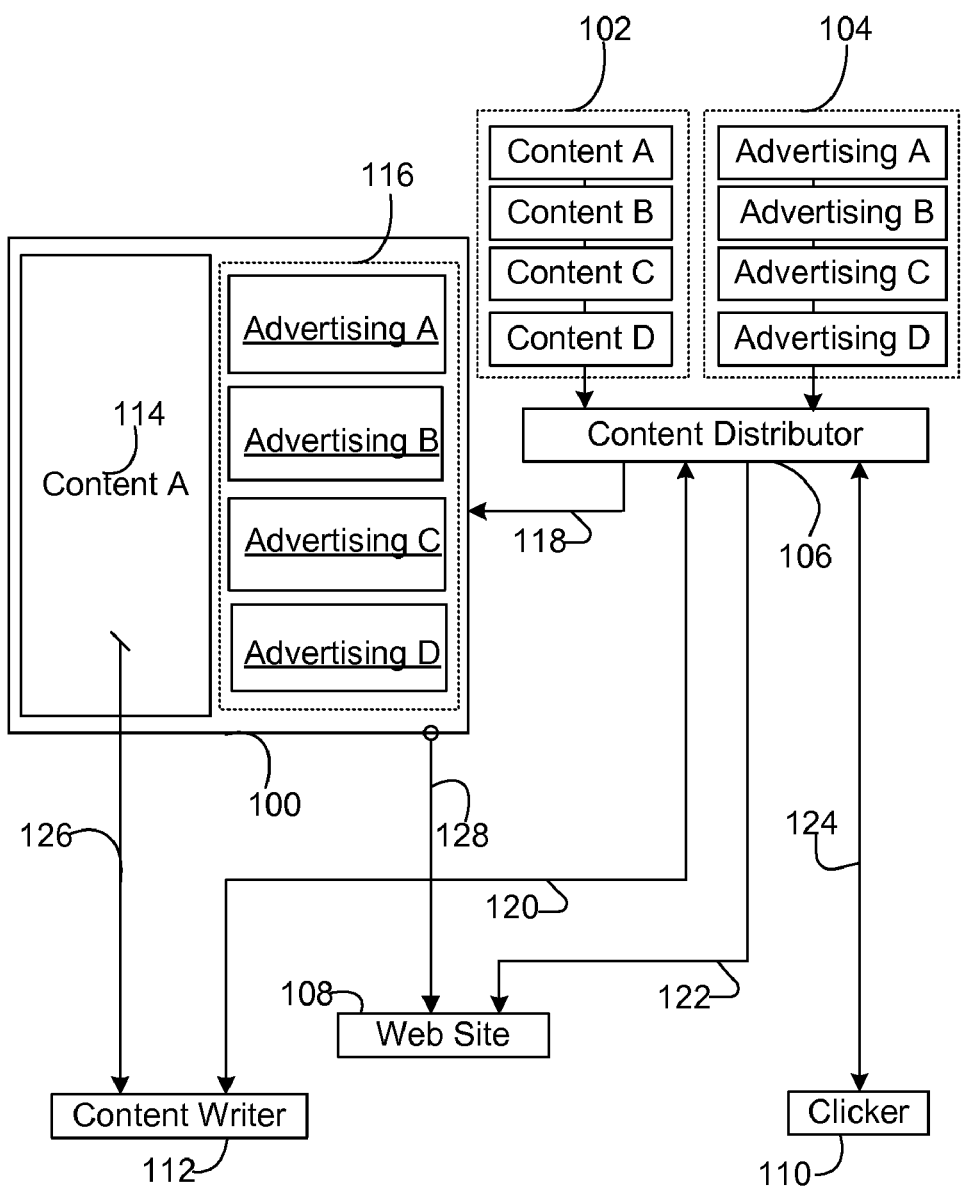
FIG. 1 illustrates a method for compensating a hosting site, a content provider and a content reader when a content distributor supplies user-provided contents along with paid content to a hosting site.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense. The scope of the invention described herein is defined by the appended claims, appropriately interpreted, along with the full range of equivalents to which the claims are entitled. In the drawings, like numerals refer to the same or similar functionality throughout the several views.

The present invention may be embodied as a method or a computer program product. Accordingly, the present invention may take a form of an entirely software embodiment or an embodiment combining software and hardware. Furthermore, the present invention may take the form of a computer program product on a computer-readable storage medium having computer-readable program code means embodied in the medium. Any non-transitory computer readable medium may be utilized including but not limited to: hard disks, CD-ROMs, optical storage devices, or magnetic devices.

There are many ways of placing contents in a web site, by having a server as the host of the contents and the advertising or registered web sites presenting them to a user through a web service (a program in the server to allow the server to serve a requesting computer with services and/or contents), thus, the contents on the websites can be requested from the server and saved locally (cached) or they can be presented virtually to interfacing users. And in either case, the server does the inserting of paid contents into the content page. The terms server and server computer as used herein are synonymous and refer to hardware together with the software needed to operate the hardware.

Participating parties in the income-share program are preferably registered with the server providing the contents. Once a user clicks on advertising, the server charges the click to an advertiser. The server also allocates a commission (some fraction of the charge to the advertiser) to the user who clicked to the web site hosting the advertisement, that is, the paid content. The server also allocates a commission to the content provider. Preferably, a mechanism is used to stop fraud where a user repetitively clicks on a paid content for the purpose of earning multiple commissions. The invention may be used where there is a sale of good or service that is concluded by a user and the commission is allocated to the content provider of the non-paid content displayed with the good or service.

Thus, a preferred method of web site development is based on advertising revenue sharing, This method includes steps of: receiving paid content from an advertiser; receiving non-paid content from a provider subject to a condition that the provider may receive no compensation for the non-paid content; combining the paid content and the non-paid content on a content page; registering a user to interact with the content page; sending the content page for display on a computer operated by the user; calculating a number equaling all interactions of the user with the paid content; receiving payment from the advertiser for said number; and paying the provider based on a fraction of the payment.

A preferred method includes a step of tracking a link validation by receiving at the server a request for content from the client device. Each such request comprises the IP address of the user's computer, also referred to as the client device, the user being synonymous with client. The server encrypts the client device's IP address and sends the encrypted IP address in a subsequent content page to the client device; the encrypted IP address may be sent in a link or in a form element. When the user contacts the server again, the server receives the encrypted IP address from the client device, as well as the client's actual IP address of the client device's location, the server then decrypts the encrypted IP address and compares the decrypted IP address with the client's actual IP address, if the two IP address match, then the server validates the user's interactions; and if not, the server disregards the user's interaction.

Another preferred method includes a step of tracking a user's interaction with paid and non-paid content. Non-paid content is provided by a content provider to the server computer. The server computer sends a tracking cooking to the client device and uses the tracking cookie to associate the user's interaction with the tracking cookie and pay the content provider for the user's interaction with the paid-content that is displayed on the page and associated with the non-paid content. The user's interaction may involve clicking on advertising or buying a product or a service. Once the user logs in with the server computer, the server computer associates the accumulated user's interaction with the tracking cookie and pays the logged in user a commission for the user's interaction with the paid-content. If the user is not yet registered with the server computer, the server computer may store the accumulated interaction with the client device and associate the stored accumulated interaction with the cookie-value stored in the client device. Once the user registers with the server computer, then the server computer may pay the user based on the stored accumulated interaction associated with the cookie-value. Thus, a preferred method includes a step of paying the user for revenues generated by said interactions.

Another preferred method includes a step of tracking the length of time a user views or stays in a content page. This method logs a timestamp of the user visit to each page. Then, the timestamp is used to verify whether or not the user viewed the page or stayed on the page a length of time or longer than a time length set as a threshold. If so, then the interaction is validated as eligible for payment. If not, the interaction is invalidated and no payment for that interaction will be made.

Another preferred method includes a step of checking if a user has interacted with a content page before validating the user's interaction as a valid user's interaction. The user must answer a question providing an answer that is to found in the content page.

Another preferred method includes a step of enabling a user to suggest content hosted by a remote host. The user's suggested content is associated with second content hosted by a hosting site that the user is accessing and interacting with. Once the hosting site or the content provider accepts the suggested content from the remote host, the suggested content and the second content are presented to subsequent users accessing the hosting site. The user making the suggestion may receive a commission if income is generated by user's interaction with the suggested content, the suggested content may be advertising, goods or service for sale. Thus, a preferred method optionally includes a step of enabling the user to suggest paid content that is related to the non-paid content.

The method may be further employed to enable a suggesting user to recommend that second non-paid content be associated with the non-paid content (first non-paid content). In this embodiment, the method is preferably implemented by asking the host or owner of the first non-paid content to accept or reject the recommendation. If the host or owner of the first non-paid content accepts, then he is asked to pay a one-time fee to the suggesting user, or no compensation may be given to the suggesting user. Alternatively, if the second non-paid content is hosted locally, then after it is accepted, the second non-paid content is simply rendered with the non-paid content.

Another preferred method includes a step of targeting contents for a particular user based on the particular user's previous physical location. This location may be an address where the user previously lived; it may be a business location the user previously visited; it may be a location the user previously visited and is logged by devices such as a smart mobile phone where the GPS (Global Positioning System) records the user's movements; or it may be any other location that associates the user to a time prior to when the targeted content is presented to the user. The content may be a content related to advertising targeted to businesses entities that are located at or in the surroundings of where the user has prior association. The content may be an item for sale or a service offered that is related to a business that is located at the geographic location or in surroundings of a prior geographic location visited by the user. The content may be any type of content that is related to the user and is based on prior location associated with the user.

Another preferred method includes the step of targeting content to a user based on the user's private data that is stored in the user's personal devices (laptop computer, desktop computer, mobile devices and others) or in a cloud (computer on the Internet used to backup user's data). The user accesses the server and the server checks the user's private data stored on the server or stored in another computer and targets content to the user that is related to the user's private data.

Another preferred method is used to compensate a plurality of content providers in an environment, such as a social network or micro-blogging site. A commission for the plurality of content providers is based on the paid content that is advertised, or on a good or service sold and included (either directly or indirectly with a link) on a page with the non-paid content provided by the plurality of content providers. The paid-content may be displayed on the non-paid content page or the paid content may have an association with the non-paid content, or have an association with private data of one or more of the plurality of content providers contributing to the non-paid content page. The private data may be user's personal information, personal profiling information, or user's content stored in the user's personal device. Each user of the page may also receive a commission for the income generated from page.

Another preferred method includes a step of targeting content to a user based on one or more of the user's acquaintances (friends on a social network, or a follower in a micro-blog site, or contents on an address-book, etc.). Alternatively, the step may include targeting content to a user based on the user-acquaintance's preferences, or based the user-acquaintance's prior visited content page, or based the user-acquaintance's prior good or service purchased, or based the user-acquaintance's prior add clicked, or based on any correlation of one user to another user.

Another preferred method include a steps of: deriving a first classification group of a particular user's previously viewed pages; deriving a second classification group of the particular user's requested page; analyzing the second classification group and the first classification group to find commonalities; and using the commonalities to locate related content for display to the user.

Another preferred method includes a step of the server computer assigning an Internet domain to each registering user with the server computer. The server computer uses the user's Internet domain to locate the registered user's resource stored in the server computer and to supply to a requesting client the registered user's resource to be displayed by a client device. The server computer assigned Internet domain may be free of charge to the registered user. The server assigned Internet domain may be the actual identification used by the user to register with the server computer; it may be a domain automatically assigned by the server computer to the registered user; or it may be a domain chosen by the registered user and not associated with the registered user's registration identification stored in the server computer. This method may be implemented in a social network, a portal, a shopping mall or at any other type of website where a plurality of users register and at least one registered user has a resource stored in the server computer. The resource may be any kind including: content of any kind, profiling data, prior user's activities, and any other resource that belongs to the user or is in the user's procession.

Another preferred method involves a second user (user-b) of a website who presents additional content on the server, the additional content belongs to another user (first user—user-a), and the additional content is presented in a virtual form. A third user (user-c), who may be associated with the second user, may elect to receive the second content automatically, that is, once the second user presents the second content. The server permits the third user to have such additional content displayed automatically by election stored in the third user's profile. The server may allow a third user to elect to accept all such additional content, or elect to receive a segment of the additional content related to a specific category, sub-category, classification, etc.

Another preferred method includes a step of offering a coupon to the clicker and/or the content provider, or any involved party responsible for generating the income stream related to the clicker's interaction with the paid content. The coupon may be redeemed at the offering location if the user/clicker has stayed a certain time at a particular webpage, website, or has answered a question or has filled-in a form at the targeting site, the targeting site is the advertiser's site or a site selling a product or a service that the clicker has interacted with and the clicker was redirected from the site presenting the advertising, good or service for sale to the target site. The service doesn't have to be a service for sale it may be a service not offered for sale.

Another preferred method includes a step of receiving at a hosting server a user request for content. The content requested by the user has a user-initiated association with a first content hosted by a remote host. The hosting server retrieves the content requested by the user from non-transitory storage at the content host, such retrieval is preferably based on an authorization identification to access a URL-location of the remote host. The hosting server uses the URL-location of the remote host and opens a communication connection with the remote host. The hosting server receives from the remote host the content, preferably after transmitting the authorization identification to the remote host. The hosting server then renders the received content with the user's requested content in a content page and transmits the content page to be viewed at a client device.

Another preferred method includes a step of targeting content based on the user's GPS and ground direction: receiving at the computer a GPS location, a ground direction and a user set distance from the GPS location; the computer using the received GPS location, the ground direction and the user preset distance from the GPS location to locate a content that is associated with the received GPS location parameter; deriving a ground location at a distance away from the user's current location of the user's portable device by adding the user-set distance to the GPS location (longitude and/or the latitude); and, the computer serving the content to the portable device. Alternatively, the method may include a step of the computer detecting the user's location and if the user is at a business associated with a prior presented discount, deducting the discount from the user's bill.

Theory of Internet Communication

Figure 5:
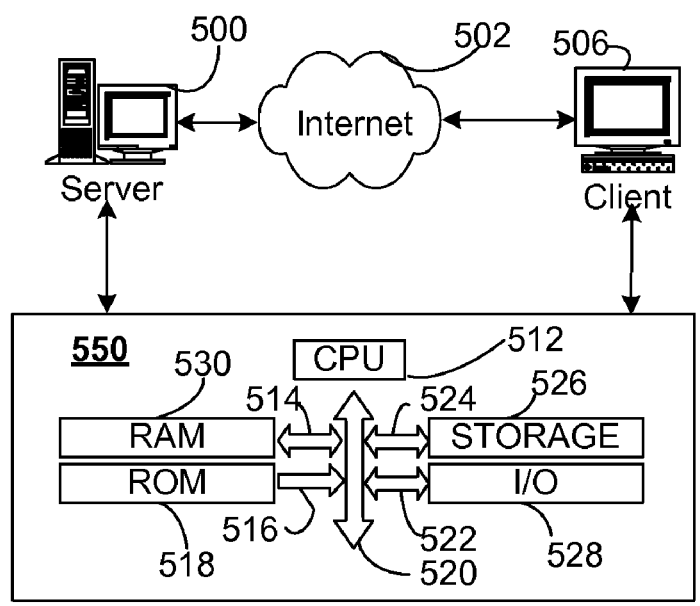
FIG. 5 illustrates client/server communication over the Internet/Network and an electronic representation of a computing device.

FIG. 5 illustrates a server (500), the Internet channel (502) and a client computer (506). The Internet channel (502) is the communication channel between the client computer (506) and the server (500). The client computer (506) initiates a request for contents from the server (500) and the server (500) returns contents thereafter. The Internet is the transport vehicle for transporting data between the two computers. Each computer of the illustrated arrangement, the server (500) and the client computer (506), has a central processing unit, CPU, (512) responsible for its functionalities.

The electronic unit (550) housing the CPU (512) may or may not have all the components depicted in FIG. 5, or it may have more components than those depicted on the electronic unit (550). In any case, each electronic unit (550) will have at least some basic electronic components like the CPU (512) and it is the brain of the device responsible for all of the device's functionalities. At power up, the CPU (512) loads instructions from ROM (518) and the instructions will instruct the CPU (512) to load an Operating System (OS) from the storage unit (526). A typical storage unit is a hard drive, other magnetic disc, Compact Disk Read Only Memory (CD ROM). The OS is loaded into Random Access Memory (RAM) (530). As needed, the electronic device communicates with outside environment through its Input/Output (I/O) port (528) and in the case of the illustrated devices, it is a network card that allows communication using the Internet.

The CPU (512) communicates differently with each component in the electronic unit (550). In some cases, the communication and interaction is two-way and in other instances, one-way. For the electronic unit (550), the CPU (512) does a one-way communication with the ROM (518) (first one-way arrow (516)) and two-way communication with all other devices as indicated by two-way arrows (first two-way arrow (514), second two-way arrow (520), third two-way arrow (522) and fourth two-way arrow (524). Each component will have input means as well, like a mouse, keyboard, and other visual interfacing means like a screen, etc. The invention may be implemented in any kind of electronic device, such as a cell phone, smart mobile phone, mobile and non-mobile devices, portable and non-portable devices, or any other computing device. The method disclosed herein may employ software downloaded and used by any computing device including a combination of online and offline computing devices. It may be a combination of online host and other portable devices.

Participating parties use the aforementioned arrangement of FIG. 5 to register with the content distributor server and provide the profiling information for the purpose of the user's interaction with it. The clicker will be logged in with the content distributor server, as to enable the content distributor server to track the clicker's activities therewith. The method may be implemented when the clicker is not logged in with the content distributor or any other server. In this implementation, the clicker's activities are tracked by using a cookie at the client device to log the clicker's activities, without requiring the clicker to be logged in to the server.

FIG. 1 illustrates a preferred method involving a Content Distributor (106) (the host of non-paid contents and paid-contents) provides a content page (100) having Content A (114) and Advertisings A-D (116), Content A (114) was supplied by Content Distributor (106) from the Content group (102) (the first content) and Advertisings A-D (116) from the Advertising group (104). As indicated by the first arrow (118), second arrow (120), third arrow (122), and fourth arrow (124), Content Distributor (106) has association with the content writer (112), Web Site (108) and clicker (110). As for Content A (114) it has relationship with content writer (112) and content page (100) has relationship with Web Site (108) (or content host like a portable device) as indicated by fifth arrow (126) and sixth arrow (128), respectively.

As indicated by second arrow (120), content writer (112) uploads or provides contents at the Content Distributor (106). As indicated by the sixth arrow (128), Web Site (108) places Content A (114) therein. Content A (114) is supplied (indicated by first arrow (118)) by the Content Distributor (106). The Content Distributor (106) adds Advertisings (116) to the Web Site (108), which is also represented by the content page (100). The content page (100) may be generated by the Web Site (108) or by the Content Distributor (106). If generated by the Content Distributor (106), the content page (100) is made available to Web Site (108). The Web Site (108) then makes it available to a connected client device. The Web Site (108) may be any kind of web host including a portable device or in any kind of device that has memory for storing content. The combination of Content Distributor (106) and Web Site (108) may be a combination of devices linked to one another or not linked to one another at all. It may be a combination of online and offline devices, or a combination of portable and non portable devices.

Figure 2:
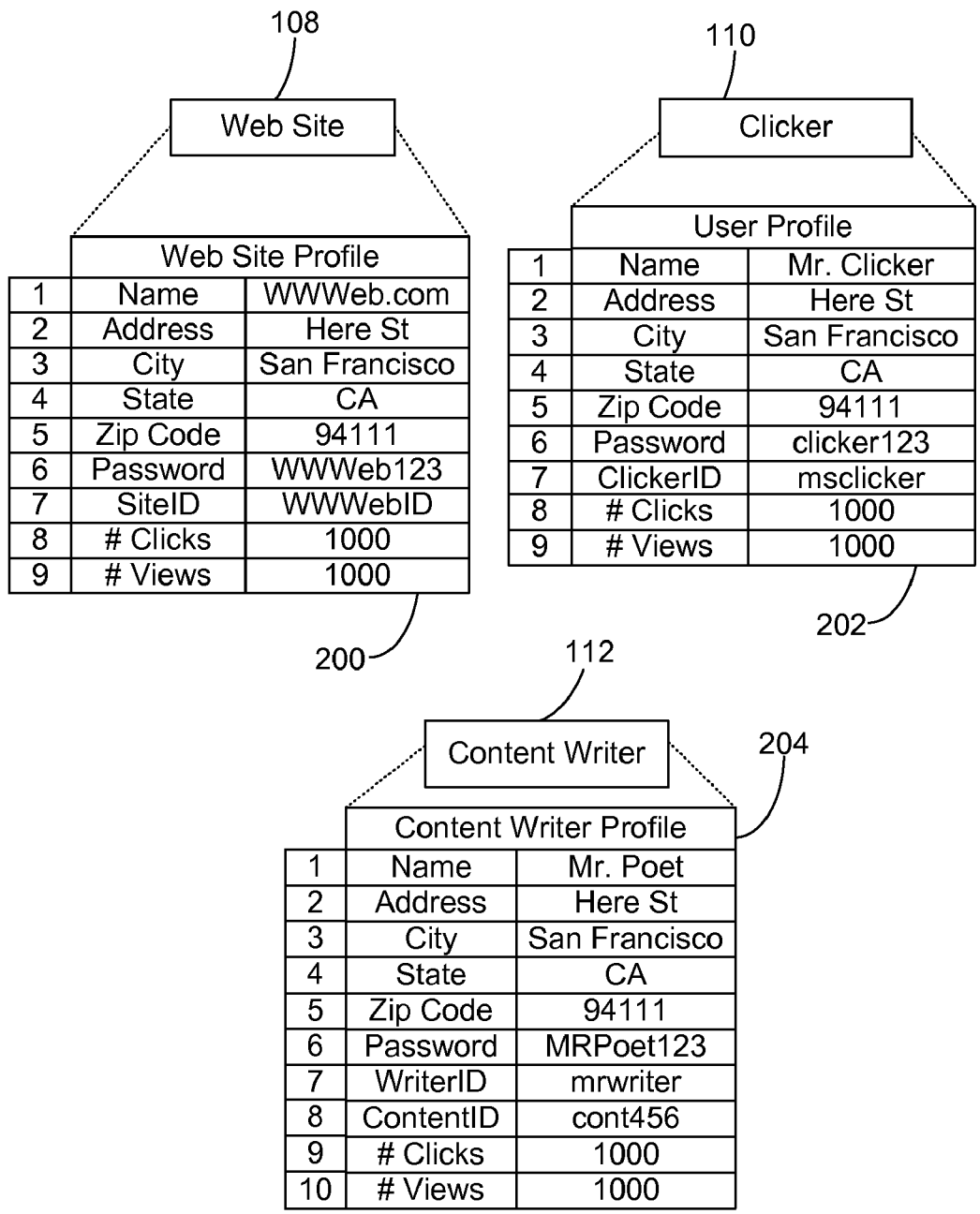
FIG. 2 illustrates three tables containing meta data for a website, clicker and content writer related to the method illustrated in FIG. 1.

Once the clicker (110) clicks on Advertisings (116), Content Distributor (106) updates the Clicker database-table (202), the Web Site database-table (200) and the Content Writer database-table (204). The Clicker database-table (202), Web Site database-table (200) and the Content Writer database-table (204). This is illustrated as a single table including all of the user's/site's profiling and interaction data; however, as with FIG. 6, each may be split in more than one table. The arrangements of FIG. 2 are one example used for the purpose of illustrating the concept using a single table and for the sake of simplicity, as well.

Figure 3:
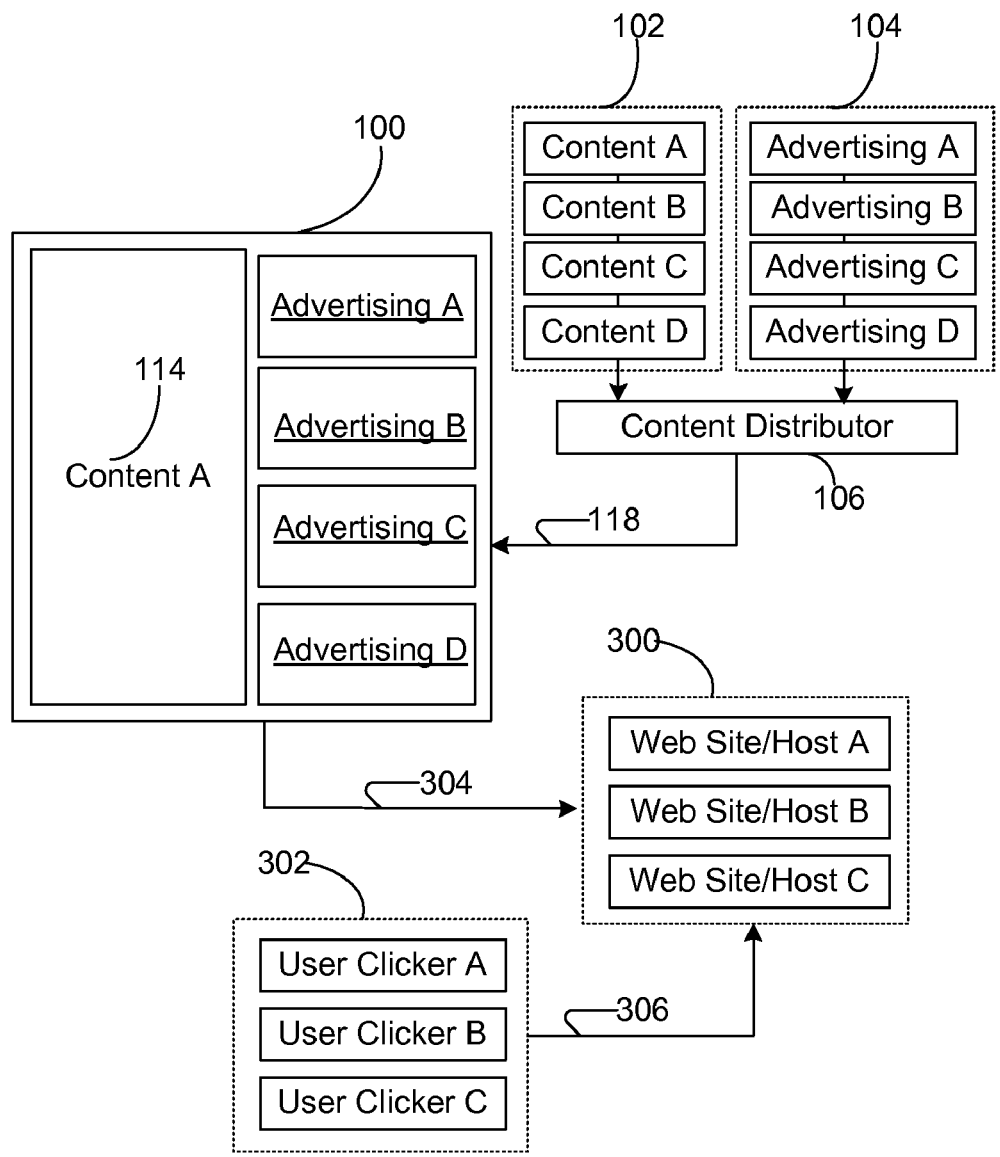
FIG. 3 illustrates a further explanation of the method of FIG. 1 where content is hosted by a plurality of sites and a plurality of users interacting with the content.

FIG. 3 illustrates a further embodiment of FIG. 1 with the addition of a group of clickers (302) and a group of web sites (300). Content distributor (106) makes its contents and advertisings available (indicated by seventh arrow (304)) to a plurality of hosting environments and a group of clickers (302) enters clicks (indicated by eighth arrow (306)) on those advertisings. FIG. 3 illustrates that this method enhances the advertising and publication processes and incentivizes the parties in ways not currently available, by encouraging creation of available contents and increasing the income stream for all involved parties.

Figure 4:
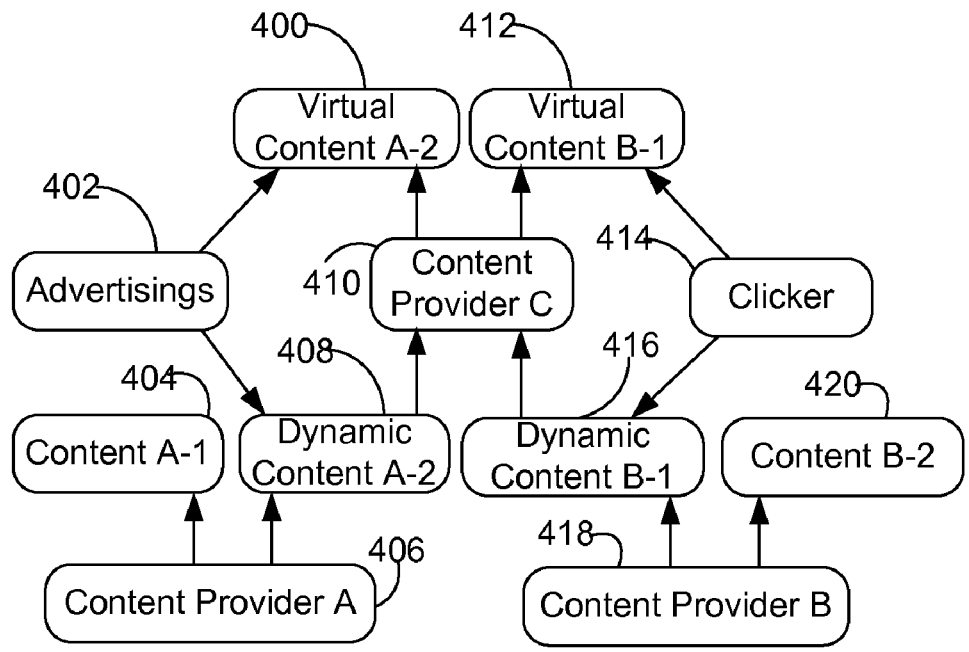
FIG. 4 illustrates dynamic and virtual content, advertising and user interactions with them.

FIG. 4 illustrates a further embodiment of FIG. 1 and FIG. 3. The Internet is a global grid where contents are virtually and dynamically hosted and available to a broad-worldwide user base as never before possible and offering a tremendous potential for the content provider, content host, content distributor and clicker. FIG. 4 shows two dynamic content providers (physically hosting the contents) and they are: Dynamic Content Provider A (406) hosting two contents: Content A-1 (404) and dynamic Content A-2 (408); and dynamic Content Provider B (418) hosting two contents: dynamic Content B-1 (416) and Content B-2 (420).

Preferably there are many registered users within a content distributor system, reader user, clicker user, content providers, hosting sites and others. The system includes the server the content distributor, and any other component like a portal, a mall, a social network, a blog host, etc.). The system assigns a domain to each registered user. The domain may be assigned at the time a user registers with the system or at any other time the user requests the system to do so. For example, the server may assign a domain automatically to the user at the time the user registers with the server. Such assignment may or may not be related to the user's registration data. The domain may be related to the user's identification with the system (user's ID) or any other identification that the user may choose. The server will allow the domain to be used by other users to locate the hosting site or the user's profile if the method is implemented in a social network environment, in a shopping site or in an electronic shopping mall, etc. The Uniform Resource Locator (URL) for the domain is typed by a user at the user's browser like 'www.usera.abc' where the 'users' is the user's identification, an identification chosen by the user, or an identification that the system has assigned to the user. The 'abc' is the generic top-level domain used to locate the user's resource stored in the server on the Internet or on an Intranet-network. The server assigned domain may or may not be of free charge to the registered user.

The user's assigned personal domain may be employed to assign any resource to the user. Such resource may be: a software application associated with the user's identification store in the server; an e-mail address associated with the user's domain assigned to the user and used by the server to locate the user's e-mail activities stored in the server and associated with the user's personal domain address; the user's personal files like downloaded video file, audio file, presentation file, etc.; a software application associated with the user and used to play video file, presentation file, audio file, etc.; or any kind of content the user may have stored in the user's personal domain and that is available to the user online FIG. 4 illustrates Content Provider A (406), Content Provider B (418), Content Provider C (410) and Clicker (414). There may be a plurality of system assigned domains that are automatically assigned to the user at the time the user registers with the system. For instance, for Content Provider A (406), the domain may be contentprovidera.abc (.abc is used for exemplary purpose but it may be .com or any other generic top-level domain), for Content Provider B (418), it may be contentproviderb.abc, for Content Provider C (410), it may be contentproviderc.abc, and for Clicker (414) it may be clicker.abc. The automatically assigned Internet domain may be assigned at the time of the user's registration with the server computer without any charge to the user and without charging the user any maintenance fee for the assigned domain. Alternatively, It may be assigned with a charge to the user for the domain and/or a charge to the user for the domain maintenance fee.

In FIG. 4, Content Provider C (410) may be a virtual content host. In this case, Virtual Content A-2 (400) and Virtual Content B-1 (412) are hosted virtually on Content Provider C (410). Virtual Content B-1 (412) is a copy of dynamic Content B-1 (416) and the Virtual Content A-2 (400) is a copy of dynamic Content A-2 (408). Content Provider C (410) virtual hosting may be in any form. Examples include: Content Provider C (410) acts as a go-in-between the other two content hosts; and Content Provider C (410) retrieves and stores a copy of both contents at the control of the Content Provider C (410). The content type may be of any content type including goods for sale, advertising, services for sale, services for user without a sale, etc. Advertisings (402) is placed at the dynamic Content A-2 (408) and the Virtual Content A-2 (400) as well.

FIG. 4 depicts the interaction that happens within the Content Distributor (106) of FIG. 1. Clicker (414) shows arrows connecting with Dynamic Content B-1 (416) and the Virtual Content B-1 (412) and this indicates that Clicker (414) is interacting (by clicking) on this content. Dynamic Content Provider B (418), Dynamic Content Provider A (406) and virtual content hosting sites are not necessarily integrated within the infrastructure of Content Distributor (106) of FIG. 1. They can be located anywhere on the Internet/Network and communicating with the content distributor using web services link.

An alternative method may be implemented when computer code to implement the algorithm of the method is stored in a non-transient storage medium in a server computer. This method includes a step of registering a user to access the server computer. Registering typically involves the user supplying an identification to the server computer and the server computer saving the user-supplied identification in the non-transient storage medium. This method includes another step of the server computer assigning an Internet domain to the registered user. Upon receiving a request for the user's resource stored in the server computer, the server computer uses the assigned Internet domain to locate the registered user's resource stored in the non-transient medium. The server computer assigned Internet domain may be free of any charge to the registered user. The server computer assigned Internet domain may be based on the registered user's identification stored in the server computer. The server computer assigned Internet domain may be automatically generated by the server computer. The server computer assigned Internet domain may be chosen by the registered user. Preferably, when chosen by the registered user, the server computer assigned Internet domain is not the registered user's identification stored in the server computer's non-transient storage medium.

Figure 6:
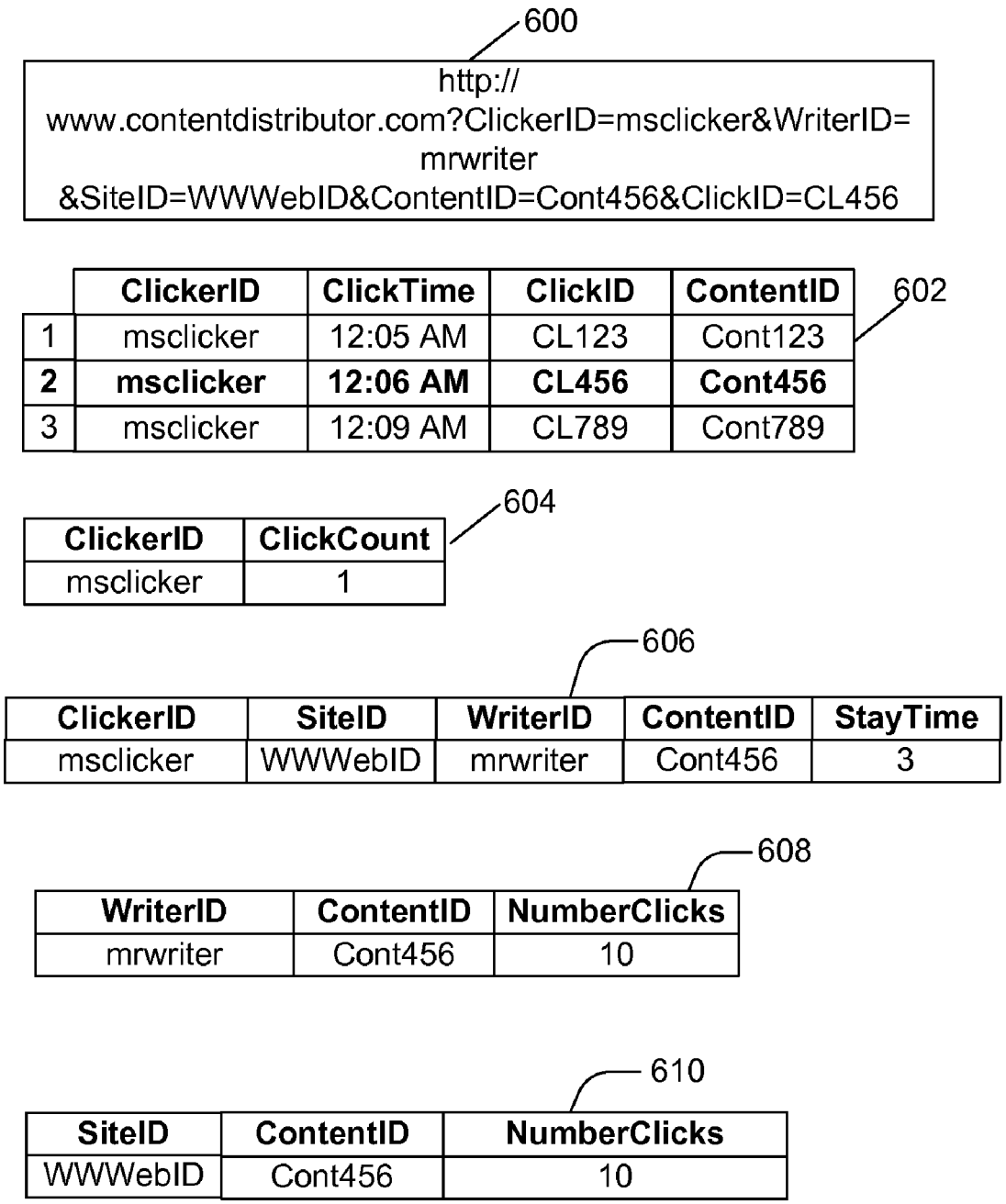
FIG. 6 illustrates a link presented to users to click on paid content and tables for tracking parties involved in generating the revenue stream.

FIG. 6 is a further embodiment of FIG. 2 showing the three tables of FIG. 2 split into more than one table. Rows 1-7 of Web site database-table (200) illustrate the site's profiling data and rows 8-9, illustrate the number of clicks and number of views for the website. Clicker database-table (202), rows 1-7 illustrate the clicker's profiling data and rows 8-9, the clicker's activities. Rows 1-8 of Content Writer database-table (204) illustrate the writer's profiling data and rows 9-10, the activities with the writer's contents.

Tables illustrated in FIG. 6 relate to several rows in the tables of FIG. 2, namely: the Web site database-table (200), row 7 (SiteID), row 8 (# Clicks) and row 9 (# Views); the Clicker database-table (202), row 7 (clicker-ID) and row 8 (#

Clicks) and row 9 (# Views); and the Content writer database-table (204), row 7 (WriterID), row 8 (ContentID), row 9 (# Clicks) and row 10 (# Views).

FIG. 6 shows tables related to the link (600): click-time table (602) contains three rows and four columns. The column "ClickerID" illustrates the ID for the user doing the clicking (if the user were not logged in, then this column would have no user identification stored in it). The ClickerID provides the means for the Content Distributor (106) to track the clicker activities and also a means for preventing the clicker from clicking over links of paid content for the purpose of fraudulently accumulating commission. In other words, the "ClickerID" is used to prevent fraud. Column "ClickTime" stores the time for the last click of the clicker. The column "ClickID" stores a unique ID assigned to each click and it will be a way of tracking the links sent to the clicker and the clicker interaction with them. Typically, the "ClickID" will have a longer value than those of FIG. 6.

The column "ContentID" depicts the ID for each content. A waiting time threshold may be setup (not shown) so as not to allow a paid content to be charged for multiple appearances during a time frame, or to be allowed to appear to the same viewer only a specified number of times during the session, etc. The "ContentID" is used to identify the source of multiple clicks over the same content by the same clicker and invalidate those clicks in such situations, thus preventing fraud. Thus, a preferred method optionally includes a step of setting a maximum number of times that paid content can be displayed to the user. Alternatively, the method may include a step of setting a minimum time period which must elapse before the user may redisplay a previously displayed paid-content on the content page.

Link (600) connects to any of the links to Advertisings (116) of FIG. 1, that is, part of the displayed content page (100) at the Web Site (108). The link (600) provides a means to connect to the website where the user is to be redirected to once the user clicks on a paid content "www.contentdistributor.com." The link in this example is to Content Distributor (106) of FIG. 1, "ClickerID=msclicker" and it is row 7 of Clicker database-table (202) of FIG. 2, "WriterID=mrwriter" and it is row 7 of Content Writer database-table (204), "SiteID=WWWebID" and it is row 7 of Web Site database-table (200), "ContentID=Cont456" and it is row 8 of Content Writer database-table (204), and "ClickID=CL456" and it is assigned by the Content Distributor (106) of FIG. 1 to the paid content to identify its location once it is clicked upon and it is the value of row 2 column "ClickID" of click-time table (602).

If the clicker (user) is not logged in then a cookie is used to track the clicker's activities and the clicker will not be compensated until the clicker either registers, if not registered, or the clicker logs in, if the clicker is registered and not logged in. The method may include a step of managing a situation where a cookie is used to track the clicker's activities and to record the clicker's activity on the server by storing a value in the cookie-file at the client device. Logged activities on the server may be saved for an indefinite time that may be related to a plurality of clicker's sessions with the server.

When the clicker (user) registers or connects with the server at any user's session with the server, the server may then notify the clicker of the clicker's accumulated points, may notify the clicker of any accumulated commission, and may pay the clicker accordingly. The server may notify the user (clicker) of accumulated points or commission at any time the server is delivering paid and non-paid content to the user even if the user is not registered with the server. The server may notify the user of the need to register by sending a link or a displayable notice to the user and by interacting with the link or displayable notice, the user may register and claim the accumulated points or commission.

The involved parties are preferably registered with the content distributor's server and the clicker may have to be logged in so as to record the clicking activities and to subsequently enable compensation of all involved parties. As indicated, the method may be implemented by a user doing the clicking who is not registered. If the clicker is not registered then all the other parties will be compensated except the clicker. When a clicker is clicking and viewing paid content the content distributor's server will track the clicker activities for two purposes: to prevent fraud and to pay all of the involved parties. The content distributor's server will have a waiting time-threshold set therein to prevent a clicker from clicking on the paid contents just for the purpose of accumulating commission and for the sake of an example, the waiting time-threshold may be set to a few seconds or to two minutes.

In click-time table (602), the first column is for the "ClickerID." Once a clicker clicks on paid content, the content distributor's server will log the clicker ID (first column, which is the same as row 7, Clicker database-table (202)). If the clicker is not a registered clicker, then row 7 will be empty and the server may use a cookie at the clicker computer to track the clicker. If a cookie is used, then the cookie key-value may be entered in the row 7. The second column has "ClickTime," which is the time the user clicked on the paid content. The first row shows the time of "12:05 AM" and for the second row the time "12:06 AM." The waiting time-threshold is two minutes. In subtracting the two values (row 1 and row 2), the time spent is only one minute and so only the first click is recorded and the second click is disregarded.

Referring to FIG. 6, once a clicker "msclicker" clicks on a paid content's link, the content server will receive the information about the click from the link (600) and as it retrieves and parses it, the click ID "ClickID" will be used to locate the stored information for the clicker in click-time table (602). Once the table row is retrieved the content distributor's server will verify the waiting time-threshold by comparing the previous click (row 2 is compared with row 1) and if the two clicks do not occur after the waiting time-threshold of two minutes, then the second click is discarded.

If the second click is not charged to the advertiser, then neither the clicker nor anyone else gets paid for the second click, thus preventing fraud. The waiting time-threshold can be any value and not necessary two minutes, as noted in this example. For instance, the waiting time-threshold could be just a few seconds, for instance. Further along the interaction the clicker clicks on another paid content and this time the third row is compared with the second row and as indicated, three minutes will have elapsed and the waiting time-threshold met, thus the second click is recorded on subsequent tables, that is, it is paid to all participating parties.

In click-count table (604) column "ClickCount," the value of "1" is stored for the first click of click-time table (602) for the clicker "msclicker" column "ClickerID." If the second click is charged, then the ClickCount column (604) will have the value of '2.' Clicker-ID table (606) stores the clicker's activities and it has for the first column "ClickerID" and it is the ID for the clicker, the second column it has "SiteID" and it is the ID for the site where the clicker is accessing and has clicked on the paid content, the third column has "WriterID" and it is the ID for the content provider/writer, the third column has "ContentID" and it is the ID for the second click (row 2 of click-time table (602) and retrieved from link (600)) and the last column (fifth column) illustrated how long the clicker stayed on the page, this is important for deducing user's interest on the clicked paid-content and for marketing purposes.

Thus, a preferred method of web site development based on advertising revenue sharing will include steps of: registering a provider to prepare free content subject to a condition that the provider may receive no compensation for the non-paid content; receiving paid content; combining the free content with the paid content on a content page; sending the content page for display on a computer; enabling a user to access the computer and display the content page; calculating a gross total of times the user displays the content page; determining a net total by subtracting from the gross total the number of subsequent times the user accesses the content page before expiration of a waiting-time threshold from an immediately preceding access; receiving payment from the advertiser for the net total; and paying the provider for the net total.

Alternatively, for hosts not involving web sites, a preferred method of host development based on advertising revenue sharing will include steps of: registering a provider to prepare non-paid content subject to a condition that the provider may receive no compensation for the non-paid content; transmitting the non-paid content to a content distributor; receiving at a host: the non-paid content sent by the content distributor; and paid content from an advertiser, the paid content comprising a link to additional information; combining the non-paid content and the paid content into a page; displaying the page on the host; totaling a number of interactions by a user with the link; receiving payment from the advertiser for the number of interactions with the link; and paying the provider for the number of interactions with the link. Optional additional steps include of paying the content distributor for the number of interactions with the link; and incorporating the non-paid content into the page as virtual content.

An alternate preferred method of web site development based on advertising revenue sharing will include steps of: providing a server computer; combining content with an advertisement; sending the content and advertisement to a user accessing the server computer; receiving at the server computer a first click on the advertisement, the first click sent by a user; saving a first indication of receiving the first click; receiving a second click on the advertisement, the second click sent by a user; setting a time period; determining if the second click is received after expiration of the time period; saving a second indication of the second click if the second click occurs after expiration of the time period; and charging an advertiser for each saved indication.

Writer-ID table (608) illustrates "WriterID" for the first column and it is the ID for the writer (content provider), the second column "ContentID" has the ID for the content and the third column has "NumberClicks" it has the total number of clicks that the content has received from all clickers and as for this illustration it is "10", and, it means that content "Cont456" written by "mrwriter" has received "10" clicks from all users (clickers). Lastly, content-host table (610) illustrates for the first column "SiteID" and it is the ID for the web site hosting the content, the second column "ContentID" is the ID for the content that was hosted by the site and receive the click on the paid content and the third column is "NumberClicks" has the number of clicks that the content "Cont456" has received from all clickers while hosted at the site "WWWebID" and it has received "10" clicks so far. Other tables can be present as well, and anyone with the skill in the art will readily appreciate in relation to the disclosure given herein and implement them as necessary.

Figure 7:
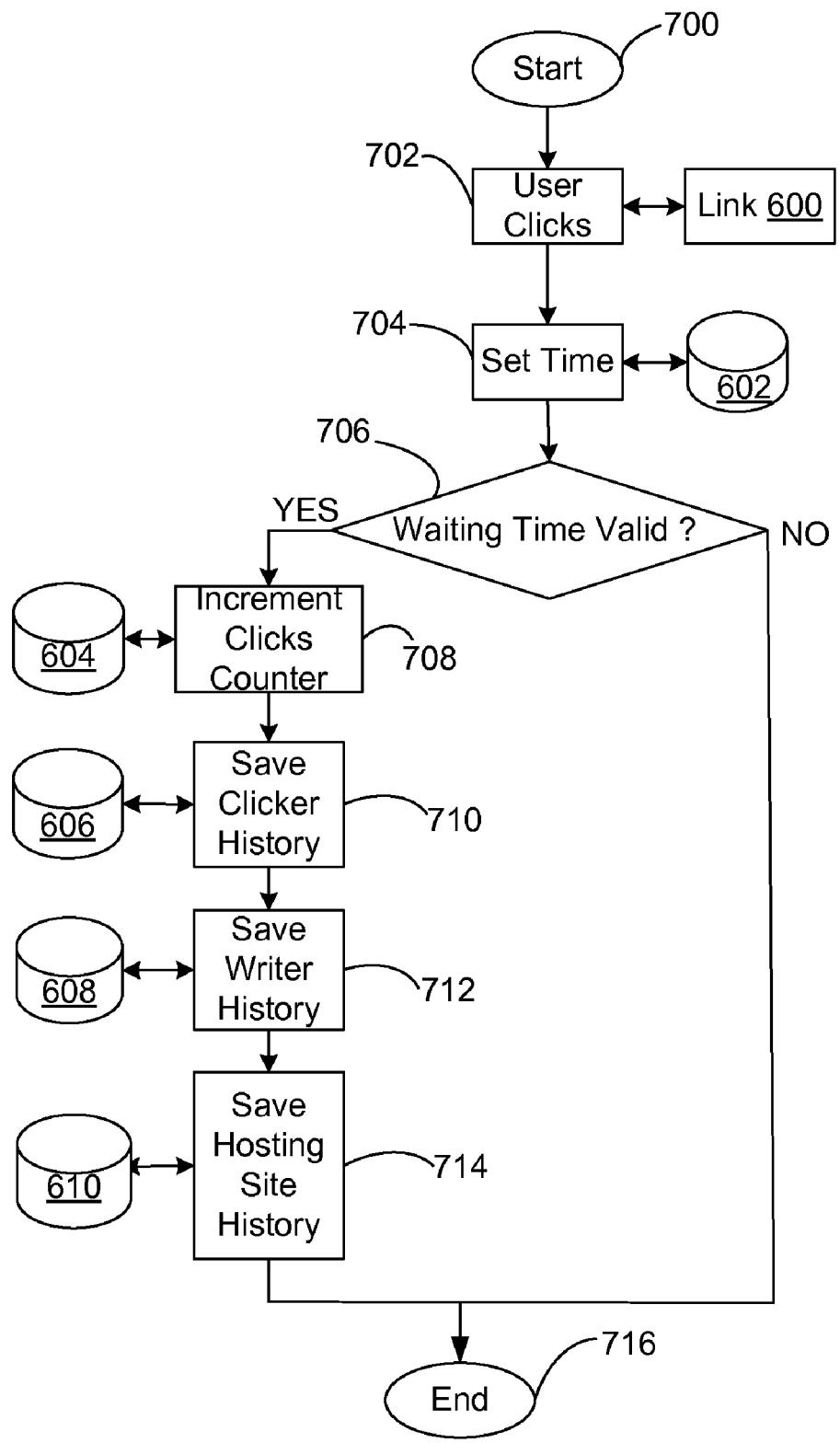
FIG. 7 is a logic diagram for using the link presented in FIG. 6.

FIG. 7 illustrates a flowchart for the tables of FIG. 6 at the content distributor's server. At the very beginning, the "Start" (700), the logic flow and the means for detecting the user clicks (702), after a click is detected as it was illustrated on the link (600) of FIG. 6, the time is set for the user and the content, as it was illustrated on click-time table (602) of FIG. 6 and indicated by the database symbol next to the set-time box (704). Once a click is received, the content distributor's server checks to see if the click is within the waiting time-threshold as aforementioned, if it isn't (yes/no diamond (706)), then the flow will move on without doing anything, if it is (yes/no diamond (706)), then the click will be incremented, increment-clicks box (708), and it is the click-count table (604) of FIG. 6, the click will be saved for the clicker, save-clicker history box (710), and it is clicker-ID table (606) of FIG. 6, the click will be saved for the writer (712) and it is writer-ID table (608) of FIG. 6, the click will be saved for the content-hosting site (714) and it is content-host table (610) of FIG. 6 and finally, the process will exit, end-oval (716).

Regarding the commission that will be paid to each participating party of the program, it may be set as a percentage or a fraction of each click and since each advertising will typically be priced differently, a typical percentage might be 10% for the writer, 10% for the content hosting site and 10% for the clicker. Of course, this is just an illustration and the percentage may be set in any conceivable way. The idea is that all of the participating parties will be compensated for their participation in the process of generating income for the content distributor.

The commission can be based on as per click mechanism where a clicker will receive a specific amount for the click. The commission can be based on redeemable points, where each click represents a number of points that can be redeemed for other amenities, cash value, goods, etc. As for the website hosting the contents from the content distributors and for the content writer supplying the content to the content distributor, they both will be tracked the content distributor as it places contents on the web site. The paid and non-paid content don't necessary need to be on a single page, they can be in separate pages, popup window, frames, etc. The content distributor can host user-supplied content as well along with paid contents.

The commission may as well be setup in such a way that the commission and or redeemable points be assigned by the commission's recipient (clicker, content provider, content host, etc.) to another entity like a non-profit organization and once a click happens in advertising or a purchase of goods or services are made the commission goes directly to the non-profit of the recipient's choice. The commission may be done in a way that the recipient's commission is split with two or more organizations chosen by the recipient. The organizations can be for-profit and non-profit organizations without departing from the true spirit of the invention. The organizations receiving commission from the commission's recipient may as well be registered organizations with the system and having an account setup with the system as to facilitate the commission assignment.

The form for compensating the involved parties may be based on a mechanism revolving around pay-per-view (for the appearance of a paid content on a webpage). All parties would then receive a commission based on the number of times the non-paid content appeared on each webpage along with the paid content. The mechanism may be setup to use the waiting-time threshold, as previously discussed. The system may be setup to just login the number of times the involved parties interact with the paid content and be compensated the same way as it has been explained for the clicking mechanism. Since anyone with the skill of the art will readily know how to implement the pay-per-view mechanism based on the explanation already given for the pay-per-click mechanism, the pay-per-view mechanism will not be explained any further for the fact that the explanation will be redundant. It is done as is for sake of simplicity and not in any way intended to obscure this invention. Furthermore, as it is well known to those of the skill in the art, paid and non-paid content can be any kind of content in any format, e.g. audio, video, print, slide presentation, maps, images, goods for sale, etc., as well, the compensation can be based on just when the interaction happens with paid contents, instead of the relationship of paid and non-paid content as it has been described throughout this disclosure.

Encrypted IP Address to Prevent Click Fraud

Click fraud may also be prevented using methods other than the method described herein while teaching uses of time-threshold. One such method involves an advertising accessed by an advertising link clicked on by a user at a client device. The advertising link includes the client IP (Internet Protocol) Address where a first user is clicking on advertisings and viewing contents. The IP address is encrypted and only the server can decrypt the IP Address once a click is performed on the advertising link. If the first user gives the advertising link to a second user, so as to enable the second user to click on the link for the purpose of generating income to the first user, the server will receive the encrypted IP address, decrypt it and match with the current-user's IP address where the click originated. If that IP address is the same as the IP address of the client computer, then the click is valid and will be charged to the advertiser. If that IP address is not the same as the IP address of the client computer, then the click may be considered fraud since the link was moved from the intended first user to the second user at a different location. Thus, the click from the second user will be invalidated. So the server will receive the IP address from the client device where the user is accessing the server, this happens the first time the user accesses the server computer. Once the server sends the advertising to the client device, the server will have encrypted the IP address and embedded it in the advertising link that the user will click. After the user clicks on the link, the client device would then send the encrypted IP address to the server for the server's verification and validation.

A preferred method may prevent fraud by implementing steps of: concatenating an original URL with an ID of a first user to form a concatenated URL; receiving a click from requesting display the concatenated URL at the server; decrypting the concatenated URL to create an identified URL and the first user's ID; verifying if the identified URL matches the original URL; validating the click if they match; if they don't match, then either the server warning the first user about an attempt to commit fraud, or the server suspending the first user from further interaction with the server.

Figure 8:
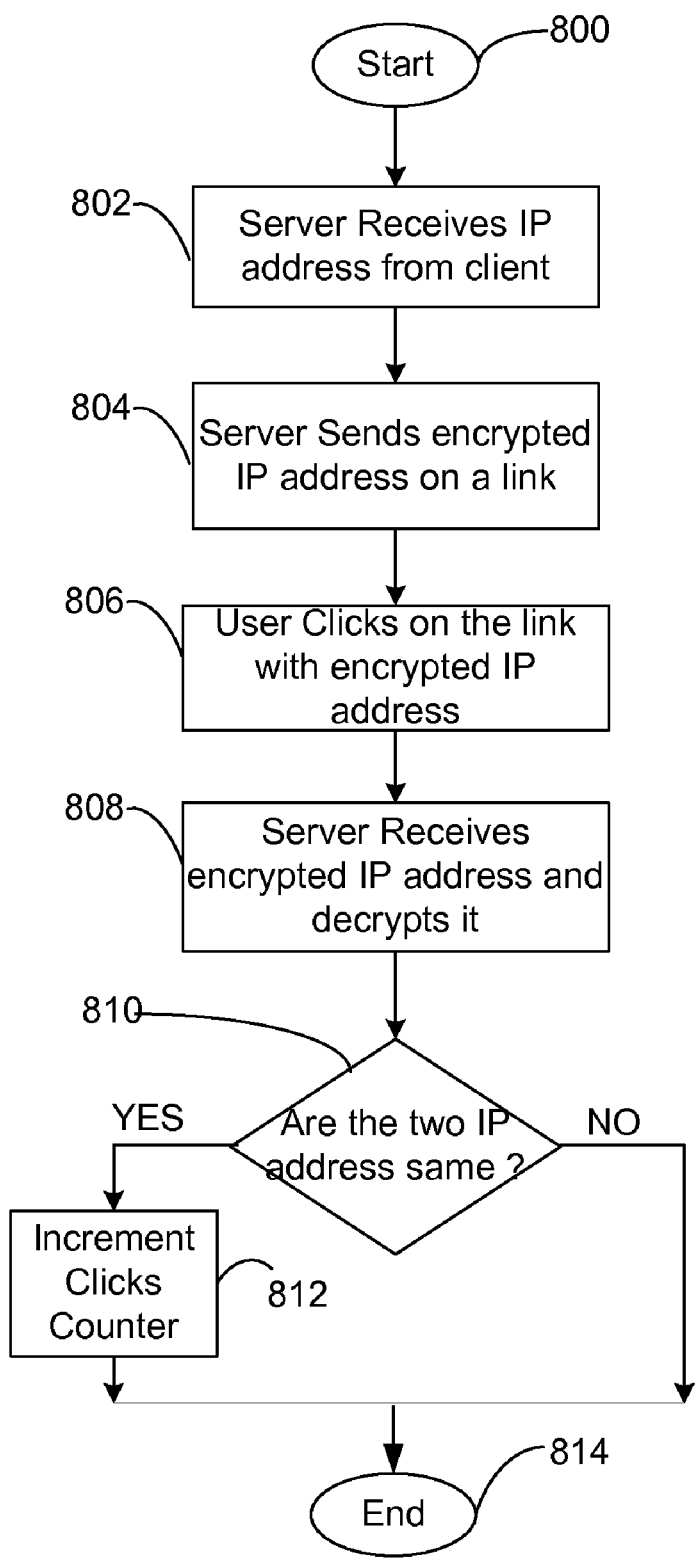
FIG. 8 is a logic diagram for tracking valid clicks based on an encrypted IP (Internet Protocol) address.

FIG. 8 illustrates a logic flow of such a method. The process starts with oval (800) once a user accesses the server. In a FIG. 8 first step (802), the server receives an IP address from the client device where the user is accessing the server from. In a FIG. 8 second step (804), the server then encrypts the IP address and sends it back to the client device in a link, designated by the link. In a FIG. 8 third step (806), the user then clicks on a link that includes the encrypted IP address. In a FIG. 8 fourth step (808), the encrypted IP address is received by the server and the server decrypts the encrypted IP address. In a FIG. 8 fifth step (810), the server compares the two IP addresses: the one received in the first step (802); and the one decrypted in the fourth step (808). If the two IP addresses are the same, then in a FIG. 8 sixth step (812), the click is validated; otherwise it is not and the process ends at FIG. 8 ellipse (814).

A preferred method comprises a hosting-computing device receiving a first request from a client-computing device the request comprising a IP address, the hosting-computing device encrypting the received IP address and including the encrypted IP address in link or form elements that are subsequent sent to the client-computing device in subsequent served content pages to the client-computing device from the hosting-computing device. The hosting-computing device receiving a second request from the client-computing device and the second request comprising the encrypted IP address and the client-computing device's IP address. The second request is an interaction to be counted as a paid-interaction. The hosting-computing device decrypting the received encrypted IP address and comparing the decrypted IP address with the received client-computing device's IP address. If the decrypted IP address matches the received client-computing device's IP address then counting the interaction as a valid paid-interaction. If the decrypted IP address does not match the received client-computing device's IP address, then the interaction is voided.

Using a Cookie to Track an Un-Logged User

A preferred method uses more than one process to track a user. While a registered and logged in user is one method of tracking a user, another method is to track a user even when the user is not registered, or a registered user is not logged in. In this circumstance, the objective is then limited to paying the content provider and/or the content host.

In tracking a user that is not logged in, a value is placed in a cookie at the client device. The cookie value is also stored at the server for each advertising sent to the client device, so the client device and the server have the same cookie value. Once the user logs in the server, the server then adds the user's clicked advertising to the user account based on the cookie value at the server and client device. If the user does not log in or the user is not registered, then the user's clicks will be accounted for and the content provider and/or the content host receive the share of the advertising revenue generated by the user's clicks or goods and services sold. The server may save the clicks for the user at the client device by associating the cookie value to the accumulated clicks and the saving may be for more one or more user's session with the server and once the user registers with the server then the server may pay the user for the accumulated interactions.

Figure 9:
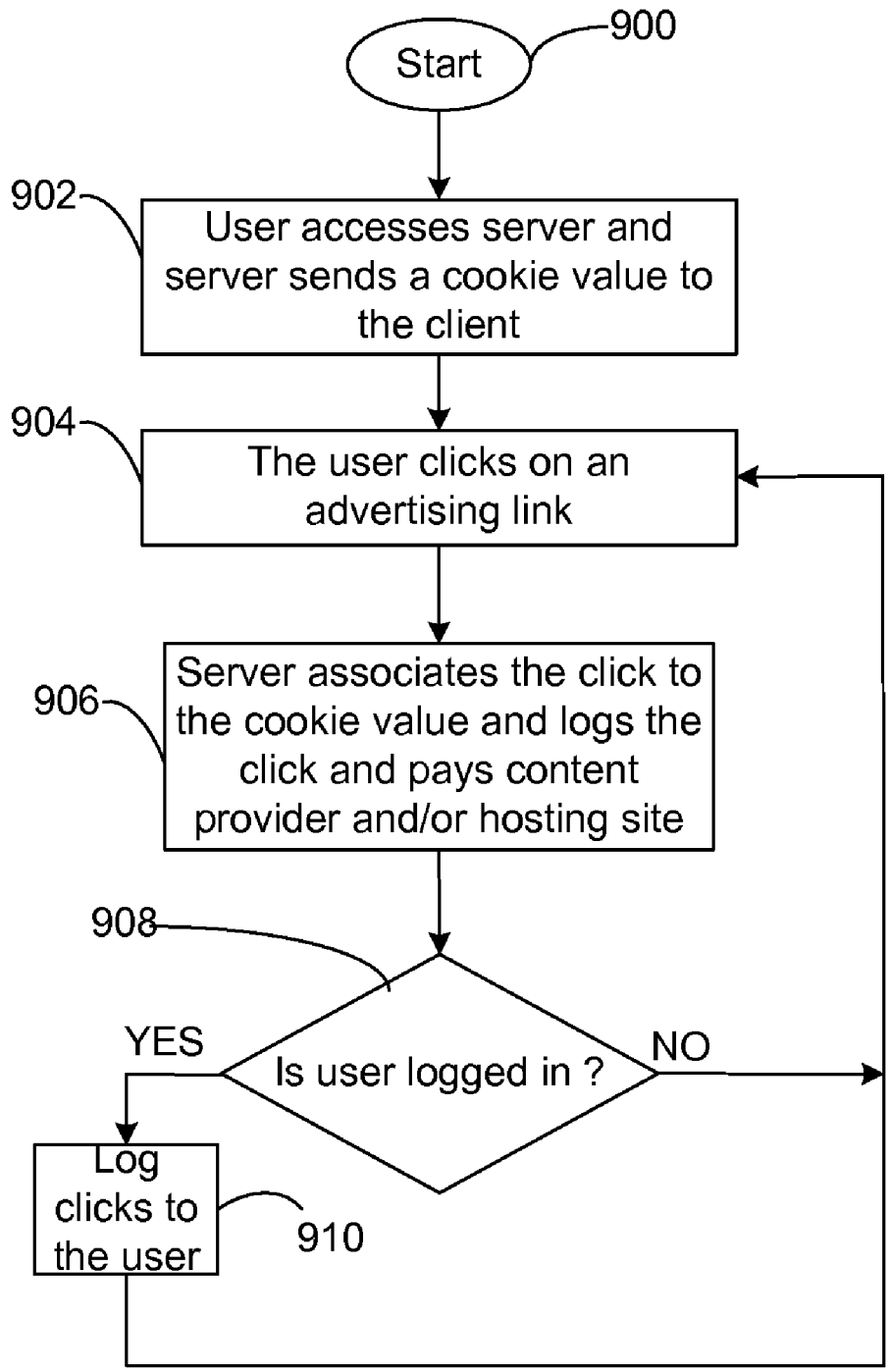
FIG. 9 is a logic diagram for tracking un-logged-in user interaction with paid content.

FIG. 9 is a logic diagram illustrating the just described method. The process starts at FIG. 9 oval (900). In FIG. 9 first step (902), a user accesses the server. The server sends a cookie value to the client device. In FIG. 9 second step (904), the user clicks on an advertising link. In FIG. 9 third step (906), the server associates the click to the cookie value and logs the click and pays the content provider and/or the hosting site. In FIG. 9 fourth step (908), the server performs a process check to see if the user is logged in. If the user is logged in, FIG. 9 fifth step (910) is performed and the click is logged for the logged in user and the process enables another user click at FIG. 9 second step (904). If the user is not logged in, the FIG. 9 fifth step (910) is not performed and the process reverts to FIG. 9 second step (904) and awaits another user click.

A preferred method comprises the presentation of paid and non-paid content displayed together in a content page. The non-paid content is provided by a content provider and the paid-content provided by an advertiser or by entities offering goods or services for sale. The server tracks a user's interaction with the content page by sending a cookie to the client device. The server computer uses the tracking cookie code to calculate interactions with the paid content and to pay the content provider and/or hosting site for interactions with the paid content displayed with the provider's non-paid content.

The server uses the cookie tracking code to accumulate interactions with paid-content that originates from the client device at the current session or at prior sessions. Once a user logs in with the server, the server using the cookie tracking code, pays the logged in user for all accumulated user's interaction with paid content.

Tracking a User's Length of Stay on an Advertiser's Page

Other processes are available for tracking the time length a clicker stays at the advertising destination site. If the clicker stays a certain amount of time (time threshold), the click is validated, if not, the click is invalidated. There are many ways of tracking how long the user stays in a content page. For example, such tracking may be done by incorporating a JavaScript program in the content page that notifies the server when the user leaves the page after clicking on an advertising. Another example uses a bar with code to do such tracking and this may be implemented through the user's web browser or on the client device. If implemented on a bar of the web browser, then the bar will check when the user leaves one URL (Universal Resource Locator) and moves to another, such as to navigate to another web site. Then the bar notifies the server when the user has been redirected to another site. The server then calculates the time spent on the prior visit by checking the prior visit time stamp (first time stamp) with the time stamp of the moment the user is redirected to the other site or page (second time stamp). The comparison of the two time stamps generates a time period by subtracting the second time stamp by the first time stamp and the result of the subtraction derives the length of time spent by the user at the prior content page (time threshold). If the time period meets a preset time threshold, than the click is validated.

Validation can occur once the user stays a certain time at the advertiser's page, or once the user answer a question on the advertiser page. Such validation might then enable charging the advertiser for the click a higher rate, since the advertiser can be assured that the user read and/or reviewed the advertiser's content. In the case of answering a question at the advertiser's web page, the process may be setup where the user's ID, associated with the user answering the question, may be collected by the advertiser's server and then matched with the user's ID stored in the content hosting site's server for authenticity (server associated with the charging of the advertiser).

The hosting server may track the user by logging the user's ID associated with a webpage's ID or the actual URL of the webpage. Once the advertiser makes a submission of the user's ID and either the URL of the advertiser's webpage or an ID of the advertiser's webpage, then the hosting server matches the submission with the user's ID and the webpage's ID or the user's ID and the webpage's URL stored in the hosting server. If there is a match, then the advertiser is charged.

In an alternative process, a user's ID is saved in both the advertiser's server and the hosting site's server. The hosting server may also log the user's ID and the URL or ID of the page that received the click. Then the hosting server may associate the user's ID with a time's stamp indicating the time the user clicked on the advertising. The content may be displayed in any conceivable manner whatsoever and not necessarily a webpage, it may be any kind of content page.

In an alternative process, a user's ID is used by both the advertiser server and the hosting site to match the user visit to the advertiser's website. For instance, if both servers contain the user's ID for the advertiser's webpage, then the click is validated and charge from the advertiser. So, after a user clicks on the advertising, the hosting server will log the user's ID and the advertiser server (or may be a site selling goods or services) logs the user's ID as well and then both servers match the user's ID to validate the user's click. Alternatively, a combination may be used, for example user's ID and time stamp, or the user's ID and the content page's ID, or the user's ID and the content-page URL.

Figure 10:
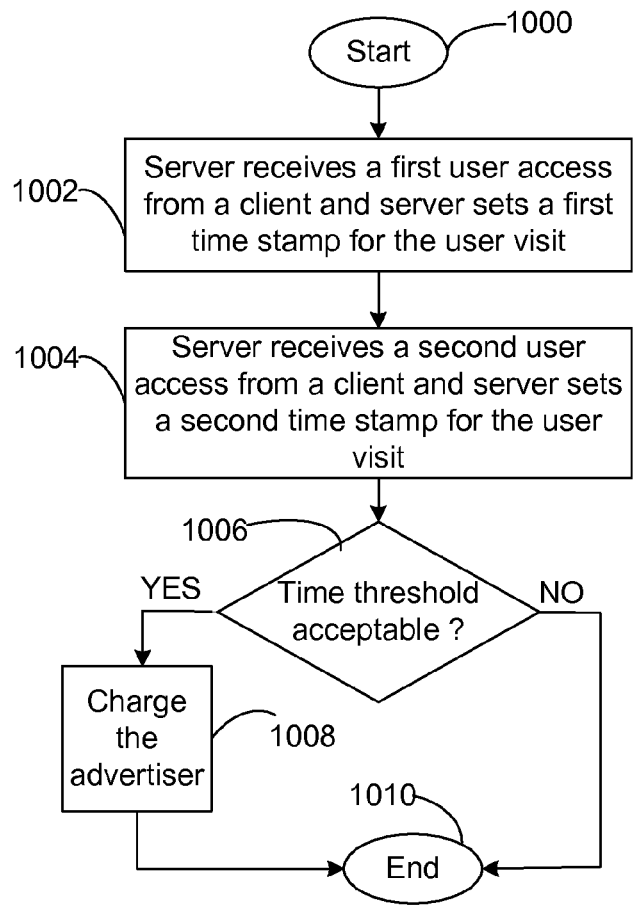
FIG. 10 is a logic diagram for tracking the length a user stays in a web page.

FIG. 10 illustrates a preferred process and FIG. 10 oval (1000) starts the process. In FIG. 10 first step (1002), the server receives a user first access from a client device and the server sets a first time stamp for the user visit. In FIG. 10 second step (1004), the server receives a user second access from a client and the server set a second time stamp for the user visit. In FIG. 10 third step (1006), the server checks to see if the time period associated with the client access meets the time threshold. If so, then in FIG. 10 fourth step (1008), the advertiser is charged and the process ends at FIG. 10 end-oval (1010). If not, then the advertiser is not charged and process ends at FIG. 10 end-oval (1010).

A preferred method comprises tracking the time a user stays at a specific page. The client device sends a code and a URL string of the page the user is navigating to at the server computer. The code is used by to track the length a user stays at specific content pages. The server saves a timestamp of the user's arrival at a content page and associates the timestamp with the user's ID at the server, or associates a cookie tracking mechanism like a code stored in the client computer. If the user's stay at a specific content page is equal to or longer than a preset time threshold, then the advertiser is charged. If the user's stay at the specific content page is less than a preset time threshold, then no charge is assessed.

Tracking a User by Requiring an Answer from the User at a Target Webpage

A preferred method tracks a user for the purpose of compensating the all involved parties for the user's interaction with the content page. Tracking may be implemented on a browser on the client device, or on the server to check if the clicker scrolls the page at the destination site after clicking on advertising. If the clicker scrolls the page, then the click costs assessed to the advertiser may higher than if the clicker does not scroll the page. Alternatively, if the user scrolls to a certain place on the destination webpage where a hint is present and if the user/clicker interacts with the hint, then the hint may present a question that can be answered with information found on the destination page (the page of the clicked advertising, the advertiser's content page). If the user answers the question correctly, then the user may receive: redeemable points; receive a higher percentage for the click; or receive a combination of commission and redeemable points. The higher commission may apply all involved parties, the clicker, the content provider, the content host, the content distributor or any other party that happens to participate.

This embodiment may be incorporated with other embodiment as to enhance click fraud prevention and to enhance trust on the part of the advertiser, seller, user, etc. The content destination-advertising page may have an answer to a hint on it, for instance, "We've been in business since 1850 and our goals are to serve our neighborhood." In this instance there may be a question in a form element that may say "When we started our business operation?" and the answer will be '1850' or, what is our goal?" and the answer will be 'serve our neighborhood' the answer type may be in the form of a text field, dropdown, radio box, check box, or any other type in any conceivable way.

Alternatively, the content destination-advertising page may have a link with the answer and once the user clicks on the link the user is redirected to a page that relates to the answer, like, a page that is related to the year '1850' if the answer to the question was '1850' as in the given example.

The content destination-advertising page may enable the user to click on a link in order to validate the answer. The question may be placed at the end of the page or just after the hint or anywhere in the page in such way that the user will have to read the content of the page to be able to answer the question properly. The hint may be at the content page that includes the advertising and the hint's answer may be in the advertiser's content page, or, the hint and the hint's answer might the in advertiser's content page.

Figure 11:
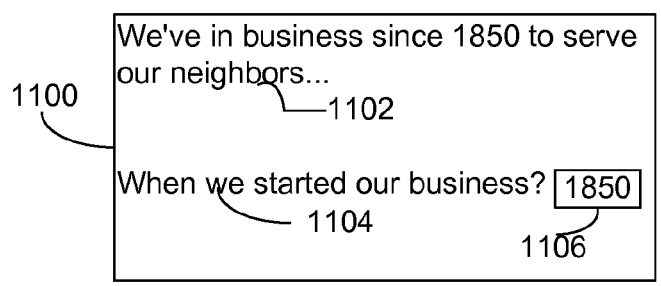
FIG. 11 illustrates a method to obtain an answer from a user to verify user's reading of the page content.

FIG. 11 illustrates this embodiment. A content page (1100) comprises a business description (1102), a question (1104) for the user to answer, and a text area (1106) where the user can provide the appropriate answer. The format of providing the appropriate answer may be any format and not necessarily a text field. It may be a checkbox, a radio box, a pull-down, or other means for the user's selection. The method may be implemented on a client device or on a combination of client device and server device, online and offline, or just offline.

A preferred method comprises a webpage presentation where the webpage content contains a question and an answer. The content page includes a means like a form element for the user to provide an answer to the question so as to confirm that the user has reviewed the content on the content page. The client device submits the user provided answer to the computer and the computer compares the user's answer with the content page's correct answer stored in the computer. If the user's answer to the question matches the correct answer, then the content host is charged for the valid answer and any involved party may be paid. An involved party may have provided other contents or services associated with the income stream generated by the user's correct answer. The content page that requires a user's answer for validation may be an advertising page, or a page having a good or service for sale. The user may reach the page by clicking on a link from another page, like a page of non-paid content provided by a content provider, or any other type of content page. The method may be implemented on a client device or on a combination of client device and server device, online and offline, or just offline.

User Suggested Secondary Content for a Content Page

Preferred methods compensate all involved parties in the process of generating an income stream including users who may suggest advertising, good for sale or service for sale to another user's content page. For instance, the content distributor or any other party of the system will have a plurality of goods for sale, advertising, services, user provided contents, etc.

A user reading a content page, a blog for instance, may be better prepared to know what kind of good for sale, advertising, services, or other contents, etc. best relate to the content being read, since that user may already know a good for sale that the user may have already purchased in the past and is related to the content on the content page, that is, in the same area of interest or the same classification, category, etc. Such a user would already knows that other users reading the same content page would be interested in purchasing similar goods or having other related contents like advertising and services, or other contents related to the content page.

Thus, in preferred methods, the user is empowered to suggest a content to be related to the content page. When such suggestion is implemented and another user clicks on a link of the suggested content, the suggesting user receives a commission of the income generated because of the user suggestion. The commission may be a percentage or fraction of: the income generated by a click on an advertisement; or the purchase of suggested goods and services, etc. The concept is to compensate the suggesting user for the suggestion.

An example of a situation involving a suggesting user involves a first user reading a blog about a trip to San Francisco, Calif. The first user knows of good restaurants, hotels, bars, etc., in San Francisco to suggest. Because such a suggestion is highly relevant, a second user reading the blog page may be more inclined to click on an advertisement based on that suggestion, for example, to make hotel reservation, purchase theatre tickets, etc. The second user doing the reading has a high motivation to click because the second user does not have to go through the process of independently finding out information related to San Francisco, Calif. because the first user already had the experience as a former visitor of San Francisco or even a resident of San Francisco.

Figure 12:
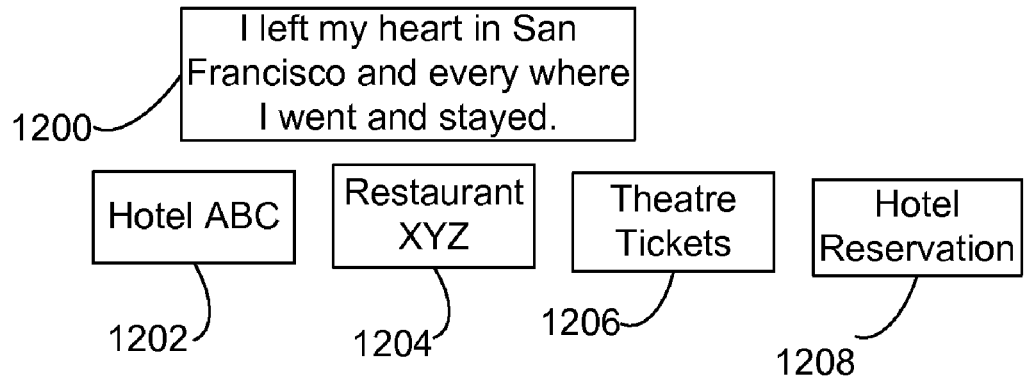
FIG. 12 illustrates a method for a user to suggest related content to be associated with the content page.
Figure 13:
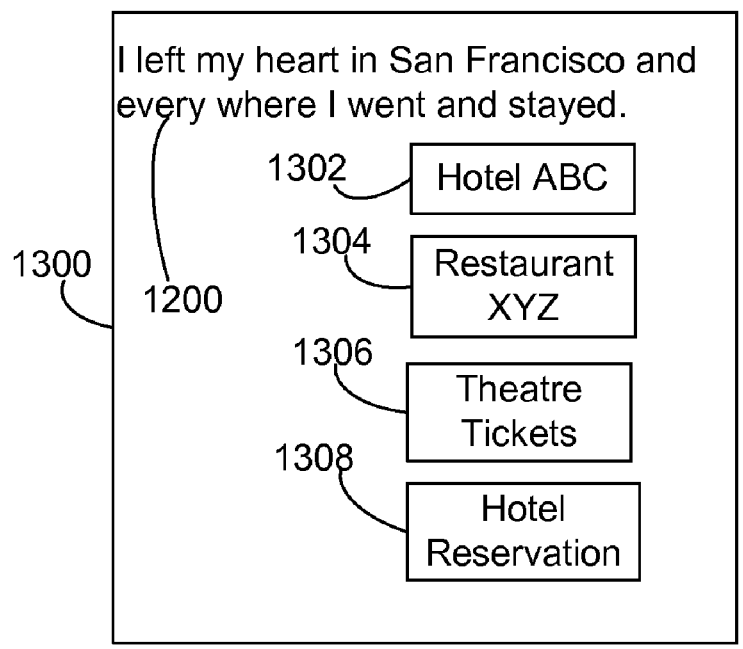
FIG. 13 illustrates another method of including the user suggested related content to the content page.

FIG. 12 and FIG. 13 illustrate the above example. There is a FIG. 12 content page (1200) that a first user is visiting and the first user suggests advertising 'Hotel ABC' (1202), 'Restaurant XYZ' (1204); goods for sale 'Theatre Tickets' (1206) and a service 'Hotel Reservation' (1208).

There is a FIG. 13 content page (1300) shown after a second user accesses the content page at a later time. The FIG. 13 content page (1300) comprises FIG. 12 content page (1200) and FIG. 13 advertising (1302), which is same as 'Hotel ABC' (1202); FIG. 13 Advertising (1304), which is 'Restaurant XYZ' (1204); FIG. 13 Good for sale (1306), which is 'Theatre Tickets' (1206); and FIG. 13 service (1308), which is 'Hotel Reservation' (1208).

Once a suggesting user suggests content to be related to a content page, the content page owner, the content provider, may have to approve the content to be related to the page, but this is not a requirement.

Also, the suggested content may be related to suggesting user's profiling information like, user's residence, user's hobby, user's sex, user's income and many other user related data not listed herein. The suggesting user may create a list of keywords to be part of the user's profiling data, and the suggesting user's suggested keywords may be used to further enhance the relationship of the content presentation.

User profiling information may be used in such way that the accessing user's profiling information may be used to designate the position the related content appears in the page. If the related content has information like keywords that are found in the accessing user's profiling data then the content will be listed higher on the content page, like the top position or the best displaying location of the content page. The right or the left side of the content page, the top or the bottom of the content and any other conceivable way of place content on a content page.

The method may be further implemented where a bidding process takes into account the user's profiling data, wherein the user profiling data designates the best displaying location of the web page for the content to be displayed. Bidding may or may not be included in preferred embodiments, for instance, it may or may not be associated with a user related content, it may be used for any kind of bidding where the user's profiling data will be used to related content to the user based on the user's profiling data, or be used to relate content to the user based on the user's profiling data and the content of the content page.

The method may include a bidding system where the bidder bids for better positioning of the bidder's advertising, good or service to be associated with a better viewing location of the content page, the bidding method relates objects of the advertising, good or service of the bidder with objects of the viewing user's profiling data.

The method may include a step of the server relating contents based on the suggesting user's profiling data. This may be followed by a step of the server using the suggesting user's profiling data along with the user's suggested contents to find matches of other additional contents to be related to the content page. The page would then have contents that are associated with the user's profiling data plus the user's suggested content.

For instance, if the user suggests a content that states 'Hotel ABC' and the user's profiling data includes the words 'Oakland' then an additional content may be suggested for approval that will be an advertising for 'Hotel ABC in Oakland, Calif.,' which is close to San Francisco, Calif. and may be more affordable. The server may also employ the user's profiling data to identify additional content related to the content page's content so as to enhance the relevance of content page. Thus, the method may include a step of presenting to the suggesting user additional contents for the suggesting user's approval or the method may automatically presents additional contents to the hosting site for the approval of the content host.

Preferred methods enable a user's suggestion of secondary contents to be associated with other content or to be included remotely into other hosting environments as virtual contents, such as where the suggested content resides at a remote location. In such an embodiment, the method may be implemented where a webpage displayed on the client web browser where the suggesting user may activate and a secondary page display secondary contents from other hosting locations, the other hosting locations may be at the same server where the content page that the user will use to associate content to is hosted, may be at a different URL, different domain host, different server, on a client device, or none of these. The suggesting user then selects an item (content, good, service, etc.) and places the item into the receiving content page. The means for the user to select the item may be: form elements; drag-and-drop; or a copy and paste operation involving selecting a link (copying the link) at a web site and pasting the link into the content page receiving the suggestion. If a copy-and-paste operation is used and the remote-hosting location associated with the link is not yet associated with the hosting server, then the hosting server may contact the remote-hosting location to inform it that user wants to use the remote-hosting location's content to associate with content of the hosting location. The hosting location may request or suggest that the remote-hosting location register with the hosting server. Preferred methods may associate remote contents from remote hosts into a single host or into one or more hosts.

The suggested content may include other paid content on the content page that is displayed to a user. If it does, then income related to interactions with the paid content is preferably paid to the owner of the suggested content page. The suggested content page may have a frame where the accompanying paid content resides. Once the client device processes the content page displayed on the browser, the client device initiates a content request for the content-owner's related paid content.

Figure 14:
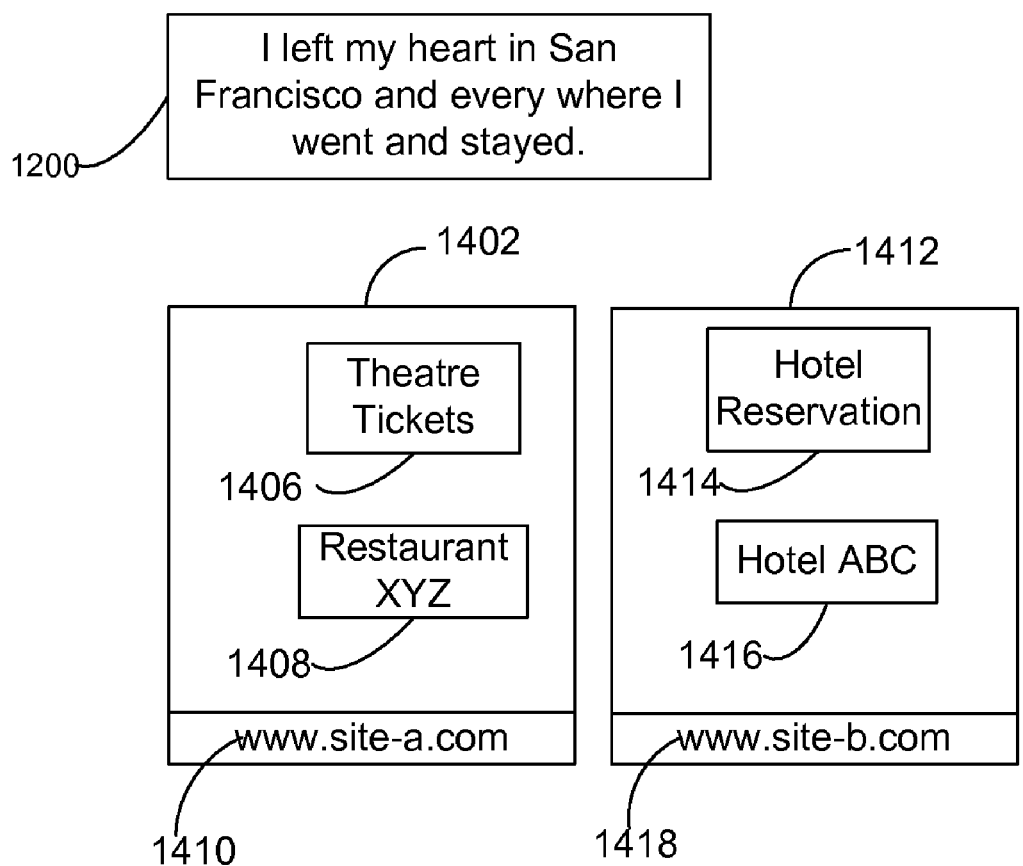
FIG. 14 illustrates another method of including the user suggested related content to the content page wherein content to be suggested resides at a remote location.

FIG. 14 illustrates a FIG. 12 content page (1200) in which a user may suggest content to be related thereto. FIG. 14 is very similar to FIG. 12, except that the content to be suggested resides at a remote location (different URL, server, network domain, at the same server with a different URL of the FIG. 12 content page (1200), etc.). There are two remote locations: FIG. 14 first remote location (1402) and FIG. 14 second remote location (1412). Both locations reside at different domain addresses. Both locations reside at different domain addresses, but it can be different URLs, servers, etc. FIG. 14 first remote location (1402) comprises FIG. 14 first domain (1410) and it hosts a FIG. 14 good for sale (1406) and FIG. 14 first advertising (1408). FIG. 14 second remote location (1412) comprises FIG. 14 domain (1418) and FIG. 14 second service (1414) and FIG. 14 second advertising (1416).

The method may include a step of enabling the suggesting user to select content by the use of form elements, drag-and-drop, cut and paste of a URL link, or any other method that will enable a user to select an item. Remote locations may register or simply list their domain address with the system and the system will fetch the contents and present them to the suggesting user. The method may be implement where the suggesting user simply performs a search with terms like keywords, categories, descriptions and the server's search mechanism will locate remote locations based on the provided search term and display to the user the items for the user selections. The method may be implemented where the search term is used by peer-to-peer and the associated remote locations will be presented to the suggesting user through a peer-to-peer transportation means.

Figure 15:
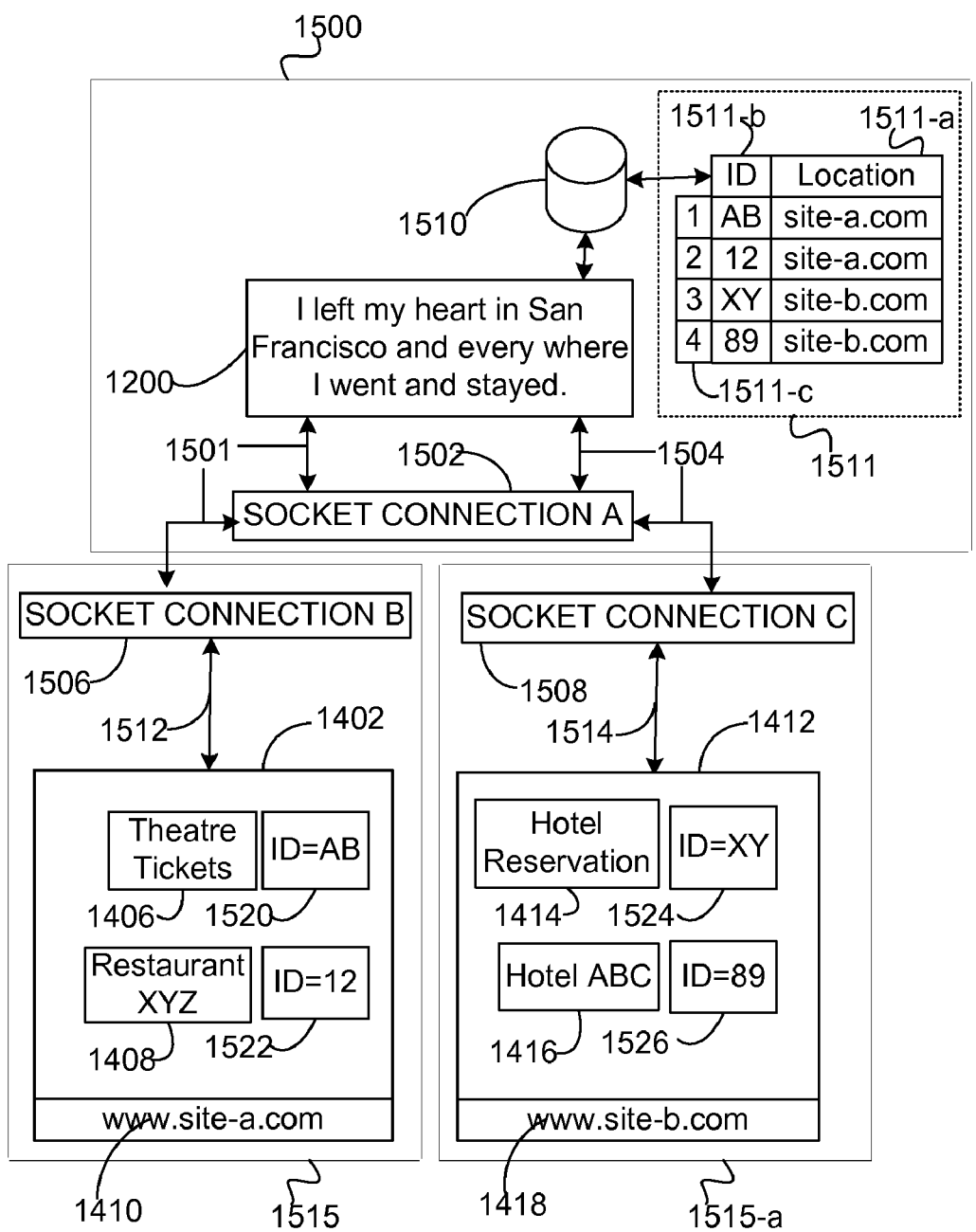
FIG. 15 illustrates another method of requesting user suggested remote content.

FIG. 15 illustrates a transportation mechanism used by a preferred method. It comprises FIG. 12 content page (1200) displayed to the user and a FIG. 15 database (1510) with a FIG. 15 database table (1511). FIG. 12 content page (1200) and FIG. 15 database (1510) resides at the hosting location of FIG. 12 content page (1200). Once the system presents contents from FIG. 14 first remote location (1402) and FIG. 14 second remote location (1412), the system will initiate communication with both remote locations and it may be implemented as depicted herein or it may be implemented using other means if implemented locally but fetching contents from different URL locations on a single domain address. For example, the transportation mechanism may be by web-services or a peer-to-peer connection.

Once contents from remote locations FIG. 14 first remote location (1402) and FIG. 14 second remote location (1412) are presented to the user for the user's selection, the server will initiate communication (represented by FIG. 15 first arrow (1501) and FIG. 15 second arrow (1504) through FIG. 15 SOCKET CONNETION A (1502). At FIG. 14 first remote location (1402), FIG. 15 SOCKET CONNETION A (1502) initiates a connection with FIG. 15 SOCKET CONNECTION B (1506) and it is used to transport FIG. 14 good for sale (1406) and FIG. 14 first advertising (1408). While transporting FIG. 14 good for sale (1406), FIG. 15 SOCKET CONNETION A (1502) initiates a connection with remote SOCKET CONNECTION B (1506) and retrieves (represented by FIG. 15 third arrow (1512)) the FIG. 14 good for sale (1406) and the advertising (1408). The same is true regarding the access to FIG. 14 second remote location (1412) where FIG. 15 SOCKET CONNECTION A (1502) initiates a connection with FIG. 15 SOCKET CONNECTION C (1508) and it is used to transport (1514) FIG. 14 second service (1414) and FIG. 14 second advertising (1416) to be viewed by the suggesting user or to be included into a content page to be consumed by a client device.

FIG. 15 shows one FIG. 15 hosting-location server (1500) and two remote locations: FIG. 15 first remote-location server (1515) and FIG. 15 second remote-location server (1515-a)). Each remote location contains contents. Each content at each remote location server has a content ID that identifies the content at the remote location server. The content ID is stored at the FIG. 15 hosting-location server (1500) in the FIG. 15 database table (1511) of FIG. 15 identification column (1511-b) within the FIG. 15 database (1510).

The content ID may also be stored at the hosting-remote location. The identifications are preferably stored at each location's server: FIG. 15 first remote-location server (1515);

and FIG. 15 second remote-location server (1515-a). The identifications are associated with each content stored therein.

FIG. 14 remote location (1402) stores FIG. 14 good for sale (1406). FIG. 14 shows first domain (1410). In FIG. 15, in the first domain (1410) stores the first content ID 'AB' (1520) and it is stored in the FIG. 15 database table (1511) as the first identification (row #1, FIG. 15 number column (1511-c)); and for FIG. 14 first advertising (1408) is second content ID '12' (1522) also shown in FIG. 15 identification column (1511-b)) and it is stored in the FIG. 15 database table (1511) as the second identification (row #2, FIG. 15 number column (1511-c)), the same explanation applies to both contents of FIG. 14 second remote location (1412) where FIG. 14 service (1414) has an identification 'XY' (1524) and it is stored in the FIG. 15 database table (1511) as the third identification (row #3, FIG. 15 number column (1511-c)), and FIG. 14 advertising (1416) has an identification '89' (1526) and it is stored in database table (1511) as the fourth identification (row #4, FIG. 15 number column (1511-c)). A transportation mechanism involving two remote hosts has been illustrated, but it may be a single remote host or any number of remote hosts without departing from the true spirit of the teachings of the invention.

Each URL-location is associated with an identification stored in the database FIG. 15 database table (1511), which the hosting server uses to communicate with remote hosts: FIG. 14 first remote location (1402) and FIG. 14 second remote location (1412). Once a user accesses the FIG. 15 hosting-location server (1500) and the user's request comprises a remote content associated with the content page or for the selection by the suggesting user, the FIG. 15 hosting-location server (1500) retrieves the first content ID 'AB' (1520) and the second content ID '12' (1522) (rows #1 and #2 of FIG. 15 number column (1511-c)) stored in the FIG. 15 database table (1511), FIG. 15 identification column (1511-b)). The FIG. 15 hosting-location server (1500) also retrieves the URL-location from the 'Location' column (1511-a) in FIG. 15 database table (1511), which represents the FIG. 14 first domain (1410) for the FIG. 15 first remote-location server (1515). The FIG. 15 hosting-location server (1500) uses the retrieved URL-location to communicate with the FIG. 15 first remote-location server (1515), which is hosted at FIG. 14 first domain (1410). The FIG. 15 hosting-location server (1500) passes the identifications 'AB' and '12' (rows #1 and #2 of FIG. 15 number column (1511-c)) first remote-location server (1515). FIG. 15 first remote-location server (1515) uses the received identification 'AB' to match first content ID 'AB' (1520) with the FIG. 14 good for sale (1406). The FIG. 15 first remote-location server (1515) then returns the FIG. 14 good for sale (1406) to the FIG. 15 hosting-location server (1500). The FIG. 15 hosting-location server (1500) then renders the received good for sale (1406) into the page with the FIG. 12 content page (1200) and the same is true for the FIG. 14 first advertising (1408). The same explanation applies to all other identifications stored in the FIG. 15 database table (1511) and the communication with the FIG. 15 second remote-location server (1515-a) follows the same principle as for the communication for FIG. 15 first remote-location server (1515) and the explanation given for the FIG. 15 first remote-location server (1515) applies to FIG. 15 second remote-location server (1515-a) as well.

A user-suggested remote content may have other content from the remote location associated with the user's suggested content. Once the user's suggested content from the remote host is retrieved by the hosting server, the hosting server implements steps of: processing the received content page; and retrieving from the remote location associated content to the user's suggested content. Associated content is any type of content associated with the user's suggested content and may be paid or non-paid content or a combination of paid and non-paid content. If the associated content is a paid content, then once the user interacts with it, the remote server bills and receives the payment for the user interaction. User interaction may be paid to the hosting server as well using the same procedures described above in which all the involved parties may get paid for the user interaction. For example, parties such as the user doing the interaction, the website hosting the content and the content provider.

The method may thus include steps of: receiving at a hosting server a user request for a content and the content having an association with a content hosted by a remote host; the hosting server retrieving from a non-transitory storage at the content host's an identification and a URL-location of the remote host; the hosting server using the URL-location of the remote host and opening a communication connection with the remote host and transmitting to the remote host the identification; the hosting server receiving from the remote host a content associated with the identification; and, the hosting server rendering the received content with the user's requested content in a content page and transmitting the content page to be viewed by the user at a client device. The association may be a user initiated association.

Once contents from the remote locations are displayed for the suggesting user's selection there will be objects associated with each content and the object will include the content's ID and the content's ID will be saved at the content host's server hosting the content, which receives the suggestion. The appropriate ID in FIG. 15 identification column (1511-b) will be associated with the content receiving the suggestion and be associated with the remote location supplying the content. The 'Location' column (1511-a) in FIG. 15 database table (1511) contains content IDs for the FIG. 14 first remote location (1402) and FIG. 14 second remote location (1412). For sake of simplicity, the ID of the content receiving the suggestion, FIG. 12 content page (1200) or the suggesting user's ID are not presented again in FIG. 15.

After the user's suggested contents are accepted, the suggested content's ID, remote hosting location's ID or domain address, and the content receiving the suggestion are saved at FIG. 15 database (1510). Thereafter, the system will use the saved information to request remote content from the remote location any time a user accesses the content page having the suggested content. Or, the hosting server may copy the suggested content from the remote location and save it in non-transitory memory on the hosting server. Or, the suggested content may already be integral part of the hosting server.

If the suggested contents are not saved in the hosting server, the server will use the saved contents IDs and pass them to the remote host in a string like: "<www.site-a.com?id=AB>" and the FIG. 14 first remote location (1402) in this instance, will return the 'AB' (1520) content, FIG. 14 good for sale (1406), which is associated with the 'AB' (1520) identification. The passing may be done differently where all the IDs associated with the remote host may be sent at once and the remote host will return the associated group of contents to the requesting hosting server. The transportation means may be implement using web-control, peer-to-peer, or any other means that may be used to transport digital information between computers.

Preferred methods may be implemented to: aggregate remote contents to a local-receiving host; use form elements; drag-and-drop; and other available means not describe herein. Once an object is select by the user, the receiving host will extract the remote content's ID and the remote host's ID from the displayed object and the extracted IDs will be used by the hosting server to associate remote contents to the local hosted content, the content receiving the suggestion. This is a novel approach since other means will simply display the remote content and a link as to enable a user to be redirected to the actual hosting location of the hosted content. In this novel approach, the suggested content is transparent to the user accessing the content page with the suggested content rendered therein.

Preferred methods may be implemented such that the system offers a variety of contents (advertising, goods for sale, services for sale, etc.). A user may, at any time after beginning viewing the content page, select a link or some other kind of selecting means and the system will bring contents related to the objects of the content page for the user selection. The user may type keywords, category, subcategory, the actual name of the facility and related contents will be displayed to the user. If the user enters a name of a facility like a name of a hotel, the system may bring advertising, goods for sale, services for sale, etc., from the user's choice facility. The user will then make a selection and once the page is displayed to a second user in the future, those suggested contents are displayed on the content page, like content related to the hotel the user suggested.

The displayed content may include a link to the suggesting user's web page, like in a social network or a page within the system and once the link is selected, the user will be redirected to the page of the suggesting user. The displayed content may include a link to the profile of the suggesting user, which may display the profile without redirecting the user to the suggesting user's profile page. The system may be implemented as to enable any interested user viewing the page to contact the suggesting user with more questions and hints. The purpose is to compensate the suggesting user and the suggesting user will act as a seller to the good, advertising or service. Selling happens once the contacting user gets a reply back from the suggesting user, much like a sales person offering additional information before a buyer is ready to make a purchase.

Thus a preferred method will include steps of providing a clickable link to paid content from a content distributor on the server computer; and paying the content distributor for each click on the clickable link to the paid content. This method may further include steps of receiving the content from a provider subject to a condition that the provider may receive no compensation for the non-paid content; and paying the provider for each click on the clickable link to the paid content.

A user-suggested business offering a good for sale or service may also be contacted separately to suggest registering with the server. A preferred method may be implemented by contacting the user-suggested business to indicate that there are users of the server that are interested in their offering. The business may agree to register and enable its offerings to be automatically incorporated into suggesting user's content pages. Such business would also be a potential advertiser, thus submitting paid content. User suggestions may be enabled by a user cut-and-paste of a link from a remote content host; or by user selection of a link at a remote content host.

Preferred methods may be implemented to enable businesses to bid on space on non-paid content pages or on paid content pages (e.g., with goods or services for sale) to enable positioning their advertisement for use by suggesting users. For example, a business may prefer their advertisement to appear at the top of a list once a suggesting user views a list of additional offering (contents, goods for sale, services for sale, advertisings, etc.) to be related to content pages. The view may be based on a page that the system presents to the user to make a selection and have the selection related to the content page the user is viewing, or may be based on keywords the user will enter in a search field of the system page. The bidding process may be based on the highest bid will have the highest (top) position, or the highest bid will have keywords for the content to be suggested matching keywords of the content page that will have the suggested content displayed in (related thereto), or any other kind of bidding process that will help a business entity to place their offering in a better position of the user's suggesting content page than other competing business entity.

Preferred methods compensate the content writer (provider) with sales commission on the goods or services that are related to the displayed content and sold to others. Once good for sale is placed on the content provider's page and the good or service is sold, a commission on the sale is paid to the content provider since the content provider is helping to produce the sale of the good. A commission for a sale may be paid to all involved parties in performing the sale, including for example, the user suggesting the good or service for sale. The mechanism of placing a good or service for sale in the page may be any of the already mentioned methods or any to be later developed that places content on the page.

Relating Contents Based on Object in the View Area of the Content Page

Preferred methods include a step for tracking the user's staying time on the page as well to track the user's movement on the page, like tracking the scrolling of the page and the speed that the user may scroll the page will determine contents that the user may read or view within the page. An example of a tracking means to enable this step is a javascript-event code in the page and once the user scroll the page the javascript-event code will capture the movement and calculates how far down, how far up, how far to the right or how far to the left on the page the user viewing area is and therefore calculates the content area of the page to determine the content viewed by the user. Another example is a pluggable programmable browser's bar for the same purpose. Other software code may also produce the same or similar result. The method may be implemented using an installed browser programmable bar.

Preferred methods also include steps to determine user interest in subject matter being viewed and the probability that the user actually read the subject matter. For example, calculating the speed with which the user scrolls the page, may be useful in implementing the method. If the user scrolls the page at a certain speed, this may be an indication of the interest of the user in the page contents. If the user scrolls the page faster, then this is an indication of lower interest. Additionally, if the user scrolls the page at a slower speed, then the probability that the user is viewing the page is higher. If the user stops scrolling the page then the content's area of the page may be processed to determine the content's object the user may be viewing at the time. The algorithm determines the viewing probability based on the speed of the page scrolling by a user, if higher speed the probability is lower, if slower speed the probability is higher, if the user stops then the user may be considered to be viewing the page's content and the page contents are processed to further related other content to the content page or to determine the user's interest to the content page.

Determining how a particular user is consuming the content, that is, reading a page, may be based on that particular user's viewing speed of an average page of contents. It may also be based on an overall average of many users. Page viewing can be measured by retaining data on how fast the user scrolls through the page. Then, such speed can be compared to a predetermined average.

Conclusions about user page consumption are preferably enabled by assessing a user's reading habits and then comparing averages to the speed on other pages. For instance, the method may include a step of assessing a user's reading habits by first determining an average for the user's scrolling speed on multiple pages viewed by the user. The more pages that are viewed and scrolled, the more the average will better reflect that particular user's scrolling speed. This step enables the system to become smarter with greater use. A predetermined scrolling speed may be assigned. For example, a default average scrolling speed may be assigned using multiple user prior experiences; by using previously assessed scrolling speeds; or simply assessing the potential user's interaction with a content page and the user's absorption of the content page. The intended target audience of the content may also be factored in. For example, if the contents are highly technical, or require advanced education levels, this will also have an impact on scrolling speed. User action may be inferred. For example, if the page is not scrolled at all, if the page has limited content or has an object that requires attention from the user, like the display of video on the page, then it may be inferred that the user is viewing the page. The method may include a step of checking the objects on the page (viewable and non-viewable objects) to determine the speed at which the page may be scrolled by the user. In some cases, when a user does not scroll the page, it may be inferred that the user has little interest in the content on the page.

Preferred methods may include monitoring a user's reading habits on a content page and using such knowledge to target content that is related to the portion of the content page which the user is currently reading. Monitoring may involve assessing user's reading habits for a specific content page then based on the average scrolling speed of other users, deducing the scrolling speed for the specific page. An assessment may be based on a user pause in scrolling of the page for a certain period of time. When a pause is detected, the steps include: calculating the pause position from page's coordinates (top, bottom, left and right) of the viewable page's content; using keywords or objects (viewable and non-viewable) in the content at the pause position to target related contents that the client may request from the server; and transmitting to the client device to render the related contents. Rendering may be: into the same content page; on a separate content page, such as a frame; over the content with transparency or over the content without the use of transparency; or in any other useful way to display the related content to the user.

Preferred methods may include a step of processing of the keywords or objects at a paused position on a page to reflect the intellectual composition of the content page. Such processing may be done by a server computer, which may be the computer hosting the content that is displayed at the client computer's screen, or may be a server computer that has access to the displayed content. If the method is implemented by a server computer, then the client computer communicates with the server computer passing information related to the user's scrolling of the page. The determination of the part of the content page that the user may be interacting with or the user may be reading may be assessed by the objects rendered on the page, if the object is a visual object and the visual object is determined to be in the user's full view, the visual object may be determined to be the part of the page where the user's viewing is focused on the content page. Thus, the method may include a step of directing the client computer to analyze the objects of the viewable area of the content page. Based on the client computer's analysis, the client passes the relevant objects to the server computer and the server computer receives the relevant objects. The server computer then searches for a set of related content. The server computer then provides to the client computer the set of related content and the client renders (displays) the received related content. Alternatively, the client computer already possesses the related content and the client processes the objects of the viewable area of the displayed content page and renders the related content to the content page as well.

Once the content at the paused position of the content page, e.g., keywords, is determined, then the processing device or the web browser in the client computer, the server, or the client device may use the keywords to locate related contents at the server or the client device that have matching keywords with the content at the paused position.

Other objects of the content page may be used for the purpose of relating content the content area of the content page where the user's interest is at that moment. Objects may include visible and non-visible objects within the content page. If the page has objects that distinguish certain areas of the content page like a title or a word in italics, bold, underlined, etc., then these distinguishable objects may be used as target keywords for relating other contents. Any other means not described herein may be used as well without departing from the true spirit and scope of the invention. For instance, the objects of the viewable area may be used in conjunction with the viewing user's profiling data like address location, sex, income, etc. to target content to the content page. It may be implemented that the objects of the viewable area of the content page may be related to other objects of contents previously viewed by the viewing user. Or, it may be such that based on a group of contents previously viewed by the user may be used to derive a one or more classification of contents that the user interacts with like: science fiction, health, travel, etc. and use the classification to relate to the objects of the content's viewable area to target other contents thereto. Alternatively, the forming of such classification may be used to target content to any kind of content page and not necessarily just the targeting of content to a viewable area of a content page.

Figure 16:
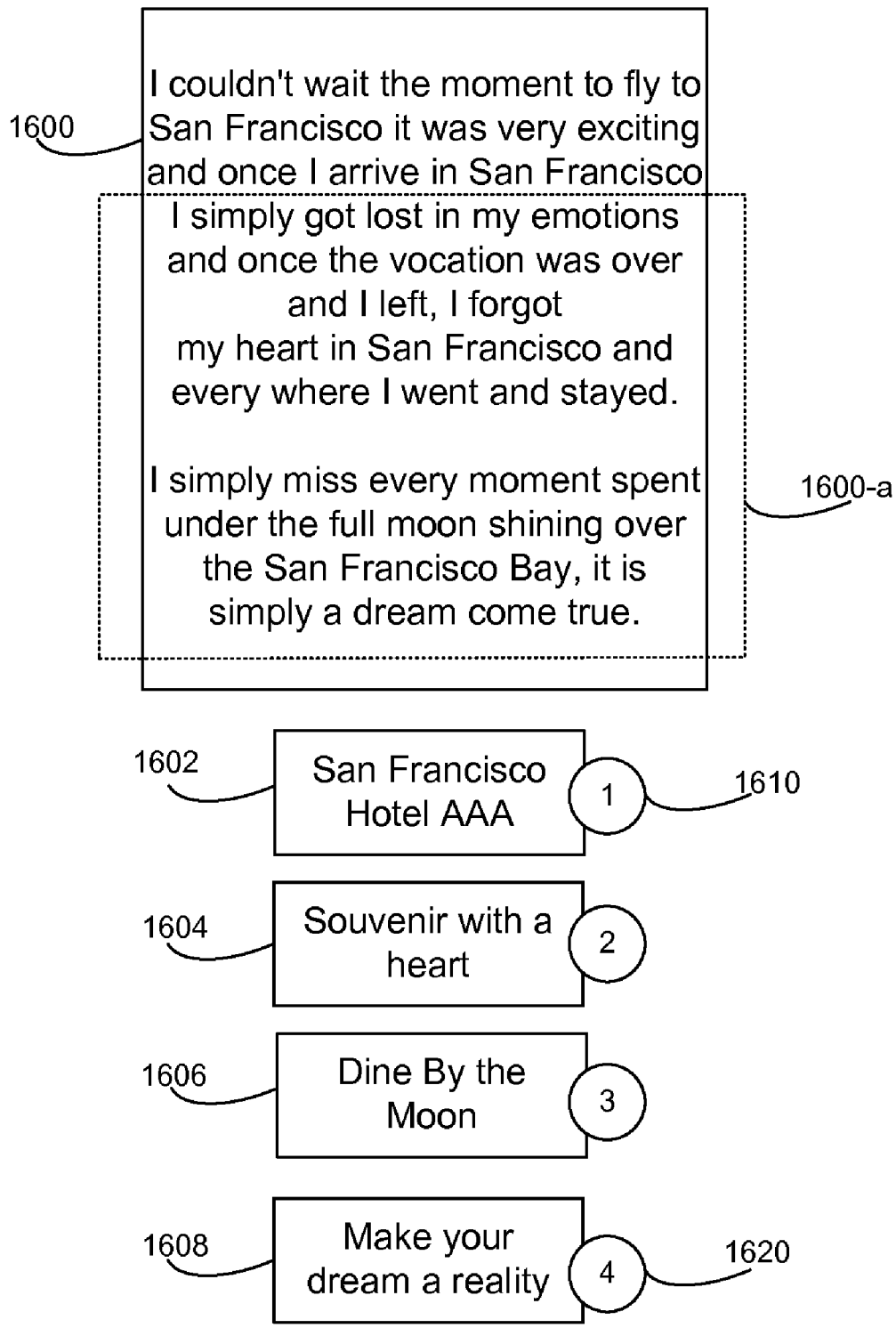
FIGS. 16-17 illustrate a method of finding content related to the content being viewed by a user.

FIG. 16 illustrates a FIG. 16 content page (1600) and FIG. 16 content area (1600-a) being viewed by the user. This occurs the moment the user stops scrolling and after a specified time threshold happens and it may me just a second after the scrolling stops, or it may be at the moment the user stops scrolling the page or it may be based on preset time threshold. The FIG. 16 content area (1600-a) contains a content portion and at the top of the FIG. 16 content area (1600-a) the keyword 'San Francisco' appears and the algorithm may process the whole area and decides that the FIG. 16 first advertising (1602) is the best target because the location of the keyword 'San Francisco' is at the top of the viewing area and further down the page states 'stayed' then the best targeted advertising is FIG. 16 first advertising (1602) that is related to an accommodation in San Francisco. The same happens to FIG. 16 second advertising (1604), FIG. 16 third advertising (1606), and FIG. 16 fourth advertising (1608). They are related to keywords as they appear on the viewing area of the content page from top to bottom of the viewing area, like FIG. 16 fourth advertising (1608) relates to keywords 'dream come true' and they are at the very bottom of the FIG. 16 content area (1600-a) of FIG. 16 content page (1600).

Preferred methods may include a step of displaying related contents in an order depending on the positional height on the display of the related keywords that caused their selection. Thus, the order that related contents are displayed on the content page may be based on the order that keywords appearing in the viewing area of the content page. For example, where the FIG. 16 first order position (1610) relates to the first position and based on the content top position that is within the FIG. 16 content area (1600-*a*). The same is true for the FIG. 16 fourth order position (1620) that is related to keywords of the content that is at the very bottom of the FIG. 16 content area (1600-*a*) of the FIG. 16 content page (1600). This is one example of relating content based on the viewing area of the content page. Related contents may follow any order desired. Examples are: related content may appear on the top of the list and the keywords of the content in the viewing area of the content page may appear on the bottom of the viewing content area; and related content may appear near, next to, or over the keywords of the content page.

In preferred methods, once a user starts scrolling and the scrolling may move the user's viewing area to a different area of the content page, related contents will change accordingly to reflect the new user's viewing area of the content page.

Figure 17:
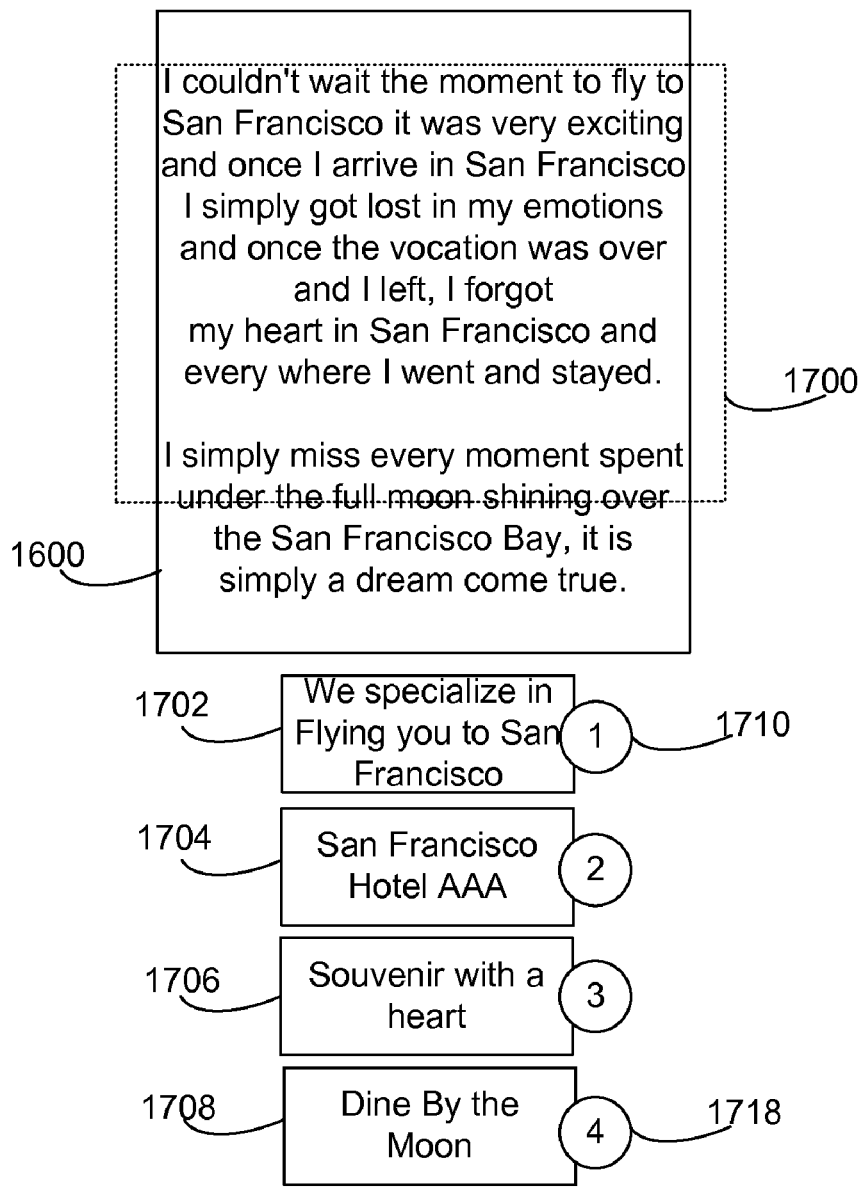

FIG. 17 illustrates a user moving of the viewing area of the content page by scrolling the content page up on the client-computer's screen. FIG. 16 content page (1600) is the same but the viewing area is new viewing area, FIG. 17 viewing area (1700). Thus, the related contents have changed: FIG. 17 first content (1702) in FIG. 17 first content position (1710) is different from that of FIG. 16. Also, the last related content in FIG. 16 at the FIG. 16 fourth advertising (1608) no longer appears at the FIG. 17 fourth advertising (1718) because the viewing area changed the displayed area content and new related content is now displayed. Thus, new related content is shown at FIG. 17 first content position (1710), which is related to keywords 'fly to San Francisco' that appear on the top of the user's viewable content at the top of the FIG. 17 viewing area (1700).

Targeting Content to a User Based Previous User's Visited Location

Preferred methods include a step of targeting content to a user based on the user previously visited location. Such previously visited location may be a geographical or physical location. Examples include: where the user has lived, a location where the user has purchased a good or a service, a previous tourist location where the user has visited and/or stayed, a previous location where the user has been and was recorded by tracking devices like a smart phone in the form of saving a GPS (Global Positioning System), and a location tracked by a longitude and latitude coordinates an a geographical area used by a GPS system.

The user may have lived in a particular location, city, state, street, zip code, etc., and the system may have such information about the user indicating a previous location where the user has been. Once the user accesses the system the system may relate contents that are location based and target such content to the user based on a prior location where the user has been. The contents that the system may target can be any kind of content including, advertising, good for sale, service for sale, instructional contents, or any other kind of imaginable content that may be target to the user and is based on the user's prior location.

For instance, assume that a user has lived in San Francisco, Calif. Once that user visits the system, the system may target content which is San Francisco related, such as for example, hotels, restaurants, theaters, etc, located in San Francisco, Calif. If the user has visited a particular location in San Francisco, for instance visited the Union Square in San Francisco, Calif., and this location was saved by a GPS device like an smart phone, the system may target content to the user that is related to the Union Square area and may include advertising related to restaurants, hotels, tourist attractions, stores, etc. that is located in surroundings of the Union Square area in San Francisco, Calif.

Figure 18:
FIG. 18 illustrates using a prior geographical location visited by the user to target content for the user in a future visit to the system.

FIG. 18 illustrates a list of past locations previously visited by the FIG. 18 user (1800) and FIG. 18 targeted contents (1810) that are related to previous location that was visited by the user.

Targeting Content to a User Based the User's Ground Orientation on a Compass

A preferred method includes a step of targeting contents to a user based on the user's ground orientation (south, north, east, west, northwest, etc.) on a compass of a portable device operated by the user. For instance, the portable device may have a compass indicating the ground direction that the user intends to go to reach a destination. A step may include targeting content at or on the way to the destination. For example, if the user is heading in a southerly direction, the step includes targeting content that may be found in a location south of where the user is at that moment. The targeting may be accomplished by the server or the user's portable device using the GPS location of the device and using GPS based locations of content on the device or server to target the content. If implemented on the server, the server receives from the portable device its GPS coordinates and the ground orientation and the server calculates the coordinates of the GPS location and the ground orientation. The server then implements a step of locating other content that is GPS based in the direction desired; and sending the content to the portable device.

Algorithms are known that translate GPS-based location (longitude and latitude) into specific zip code or street address; some have the precision of the street number. A step may be included of receiving a user-specified input, such as distance from the GPS location, or the ground direction the user desires to receive content from. For example, the server may receive a user designation of: one mile ahead of the user's present location; a half-mile ahead of the user's present location; one hundred feet ahead of the user's present location; or any distance set by the user. Once the user moves and the direction changes, the device may update the content by calculating a new GPS location and the new ground direction. New content may thus be displayed to the user based on the new GPS location the user's ground direction the device is pointing to.

A user-specified input of distance from the GPS location from where the user currently is used by the server for calculating how far ahead from where the user is for the purpose of fetching contents from locations that are just ahead of the user and in the same direction the user's portable device is pointing to. The user-specified input of distance is added to the GPS parameters (either the longitude or the latitude, it may be that the user-specified input of distance is added to both: longitude and latitude) in the same direction the user's portable device is pointing thereto. By adding the user-specified input of distance to either or both of the longitude and latitude it will increase the distance range to just ahead from where the user is and on the direction where the user's portable device is pointing to.

The method may include a step of enabling the user to specify other parameters. For instance, if the user-specified input of distance is three miles and the user is facing north then the server implements a step of presenting related content to the user that is located three miles north from where the user is currently located. The server may enable the user-specified input to include a radius, for example a one mile radius, so that the server will find and present related content to the user that is within a radius of one mile radius around the path to the destination three miles north from where the user is currently located.

A preferred method may include a step of sending a coupon or other offering of business located in the user's surroundings. If the user patronizes the business, then the user may redeem the offering (coupon, discount and others) once the user arrives at the business establishment. If the content is based on advertising, then the user may receive a commission from the advertising once the advertising is clicked on or if the user actually goes into the business establishment associated with the advertising. A step may include receiving the user's GPS and if the received GPS location associates with advertising that was presented to the user, then the user gets a commission, which means the user is at the actual business location from the prior advertisement presented to the user.

The method may be further implemented with the steps of: contacting the business establishment's server; and passing the discount to the business for automatically applying to the user's bill. Thus, once the user is ready to pay for services rendered or goods sold, the coupon value is automatically deducted from the user's bill. These steps are preferably performed after the server determines the user's location to be at the business establishment that had a coupon or offered the discount promotion previously presented to the user. Such automatic implementation may be implemented with a step of associating a code to the user's device and with the server implementing the method. Once the user employs the portable device to make payment to the business establishment, then the deduction automatically applied. If the portable device is not used to make payment, then the user may furnish the code to the business to apply the discount to the purchase. The redeeming mechanism may be redeemable points or any other means for compensating the user disclosed herein.

Offering a Coupon to a Clicker and/or Content Provider

The method will preferably compensate the clicker and/or the content provider for click on an advertising or the purchase of a good or service, where the advertiser or the seller may send a coupon to the clicker and/or the content provider and the coupon may be redeemed at the issuing facility on the coupon receiver patronizes the issuing facility. The coupon may be give once a clicker stays a certain time length at the issuing facility site, web page, etc. The coupon may be issued once the clicker answers a question at the issuing facility's website, web page, etc. This is a novel means since the clicker and the content provider will have a motivation to patronize issuing coupon facilities and they will retain the brand name of the issuing facility as well.

Relating a Content Based on Common Classification Group

The disclosed method is useful for relating contents based on a common classification between two or more contents. The common classification is in the form of: a category common to two or more contents; a sub-category common to two or more contents; a class common to two or more contents; etc. Steps include storing a user visited content pages; placing the content pages in a learning module; parsing the content pages' objects using the learning module; choosing which objects are to be grouped in a particular category; and forming a particular classification of visited content pages for the user. For instance, if a user views many pages related to travel and object-words like: travel, visit, air fare, etc., then the method will deduce that the pages are related to a classification 'tour', 'vacation', 'travel', etc. An additional step is classifying a group of pages to one or more classifications based on the content pages' objects. The server may classify the content page at the time the user is visiting a content page or the server may classify the content-pages as batch at off peak time.

The learning-system module may learn by comparing a content page's object with a list of other objects that has been classified by the system or by a human being, for instance, using known objects to be related to a particular classification. For example: 'trip' is related to 'travel,' but only if the word 'trip' and another word related to travel appears on the same content page, for instance the word 'vacation.' Since the word 'trip' has more than one meaning, the learning system should be smart enough not to confuse the word 'trip' related to travel with the word 'trip' related to a different classification.

In other words, the method includes a step of parsing user visited content pages' objects and deriving one or more classifications for the user (first classification group). Once the user visits a content page, a step includes parsing the content page's objects. Another step is deriving one or more classifications for the content page (second classification group). Another step is associating contents with the content page, where the associating contents have a similar or the same classification with the first classification group and the second classification group. The step of deriving a classification group for a content page may be accomplished by parsing the content page's objects while the content page is being saved by the server computer or at any time, such as, in an off peak time of the server computer.

The parsing step may be used for all the objects of a content page or just for the objects that are viewable by a user. If the parsing step is performed just for the viewable objects of the content page, then once the server computer receives the screen coordinates from a client device, the server computer implements steps of: fetching the content; parsing the objects that are associated with the user's viewable area of the content page; using the objects to find a classification group for the objects; using the classification group to categorize objects in the viewable content area; associating the classification with one or more other classification groups for the user; and targeting new content to the content page on the client computer based on one or more contents that relate to the two common classification groups.

The method may be implemented in such way that when a content page is requested by a client for a user at the client device and just before the server sends the content page to the client device, the server parses the content page's objects and find a classification group, then the server matches the classification group against contents stored in the server having the same or similar classification group. In this particular situation, the matching of contents to a classification groups is not necessarily related to the user's classification group.

The method may further a steps of deriving a classification group from several sources including: user profiling data; a user's comment on a content page, a user's visit to the user's friend's profiling page's in a social network; the user's friend's profiling data, etc.; and compensating users helping in the process of generation an income stream.

Figure 19:
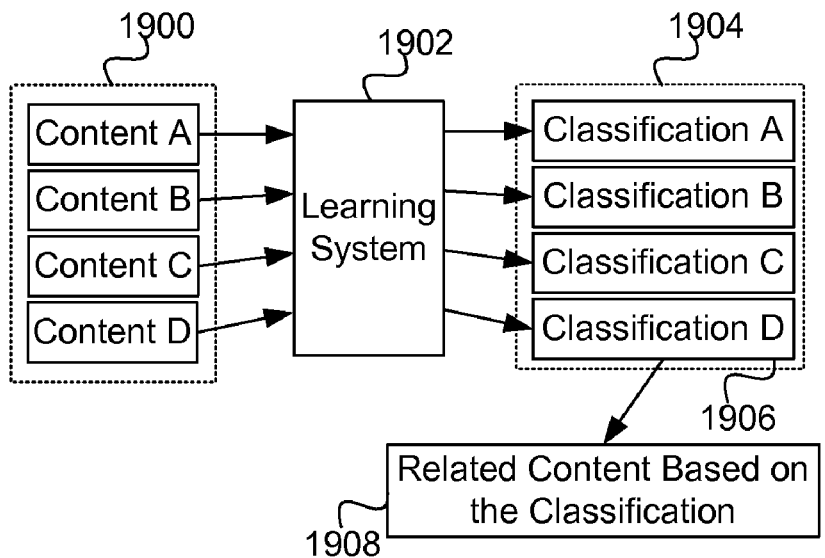
FIG. 19 illustrates the step of deriving a classification group from a plurality of content pages.

FIG. 19 illustrates a FIG. 19 content group (1900), a FIG. 19 Learning System (1902), a FIG. 19 classification group (1904) and a FIG. 19 related content page (1908). The FIG. 19 content group (1900) is parsed by the FIG. 19 Learning System (1902) and the FIG. 19 classification group (1904) is derived. The FIG. 19 related content page (1908) is related to 'Classification D' (1906) of the FIG. 19 content group (1904).

Figure 20:
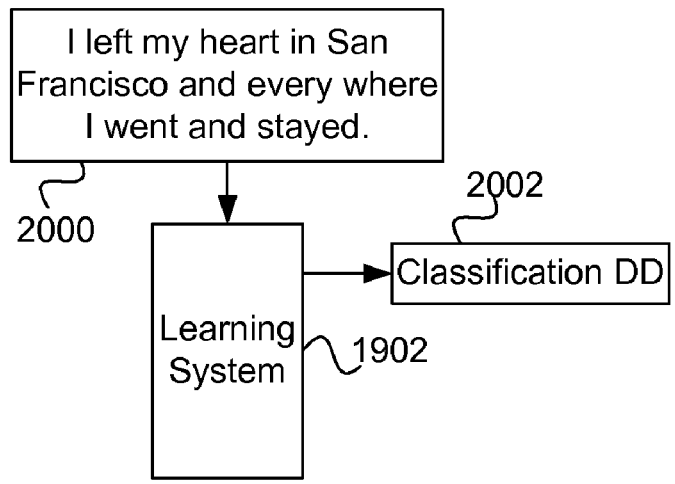
FIG. 20 illustrates the step of deriving a classification group form a single content page.

FIG. 20 illustrates a FIG. 20 content page (2000) being fed to the FIG. 19 Learning System (1902) and a FIG. 20 classification (2002) derived from the FIG. 20 content page (2000). While a single FIG. 20 classification (2002) for the FIG. 20 content page (2000) is shown, more than one classification group may be derived. Deriving the FIG. 20 classification (2002) for the content page (2000) may be performed by the server computer at the time the server computer saves the content page (2000) or it may be done at any other time, such as, at off-peak time.

Figure 21:
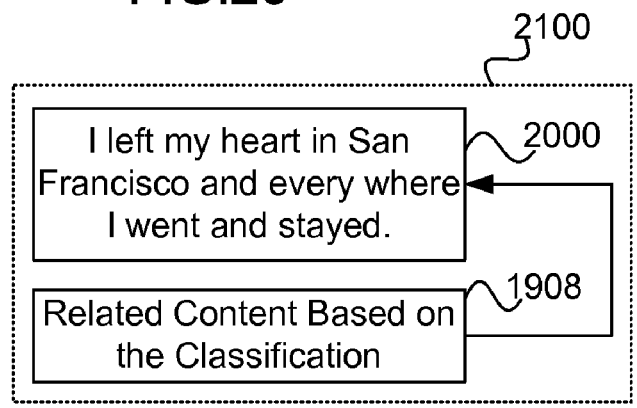
FIG. 21 illustrates the presentation of a content page that includes the user's requested content and a related content when the related content is based on a common classification group between the content page and other content pages previously viewed by the user.

FIG. 21 illustrates a step of associating the FIG. 20 content page (2000) and FIG. 19 related content page (1908) associated with the FIG. 20 content page (2000). Once a client device accesses the FIG. 20 content page (2000), the server computer (or any computing device) parses the FIG. 20 content page (2000) and derives the FIG. 20 classification (2002), namely 'Classification DD.' The server computer then performs a step of accessing the FIG. 19 classification group (1904) and retrieves from the FIG. 19 classification group (1904), 'Classification D' (1906). 'Classification D' (1906) of FIG. 19 is similar to the FIG. 20 classification (2002), namely 'Classification DD.' The server computer implements a step of fetching FIG. 19 related content page (1908) and sends it to the client device for display, as shown in FIG. 21 content page (2100). The FIG. 21 content page (2100) includes FIG. 20 content page (2000) that was requested plus the FIG. 19 related content page (1908) that was derived. Once sent, this finishes the process of relating a content to a content page based on a common classification group.

Relating a Content Based on Saved User's Information at a Device

Another preferred method of the present invention includes a step of targeting content to a user based on the user's private data stored in the user's personal devices (laptop computer, desktop computer, mobile devices and others) or in a cloud (computer on the Internet used to backup user's data). When the user accesses the server, the server checks the user's private data stored within the server, or stored in another computer, and targets user secondary content that is related to the user's private data.

The method preferably involves a server (also known as a server computer). While receiving a request for a content page, the server implements steps of: identifying objects within the content page; finding an association between the identified objects and other contents saved at the user's devices or other user saved contents in a server in a network cloud (the term cloud refers to the on-demand provision of computational resources (data, software) via a computer network); and associating the other contents with the user identification stored in the server. The server, after identifying the objects within the content page requested, may implement a step of using the objects to find an association with other objects of the user's stored information (software applications, personal data, contents of any kind, profiling data, etc.) then locating other contents that are related to the to the user's stored information in the cloud or in the user's personal devices.

If implemented in the user's personal devices, then the user's personal device may do all the required processing of the method. If implemented on the cloud, the cloud server or servers will perform the method alone or in conjunction with other devices connected to the cloud and may include a personal device.

The server preferably implements steps of: finding first content having a first association between user requested content and the user's stored information; identifying a second content having an association between the user's stored information and the requested content. Once the first content and the second content are found or identified, the server implements steps of: fetching the first content and the second content; then rendering the first content, second content and requested content in the content page. The content page is not necessarily a single page, it may be two separate pages where the requested content is first transmitted to the client device and the content page comprising a frame, and once the client executes the frame (e.g., an iframe), the server implements steps of: processing a copy of the content to find the first content and the second content; and transmitting the related content to the client device for rendering into the frame. Alternatively, these steps be implemented by two or more servers or computers, used at a single or multiple locations. For example, a first server implements a step of sending the content page with the frame. This first server may be at a first location. A second server implements a step of sending related content to the frame. The second server may be at a second location. The second server may have a copy of the requested content stored thereon.

The method may include a step of finding a single association between the user's requested content and the user's stored contents in the server computer (cloud or personal devices). Once the server receives a user request for a content page, the server employs an object on the content page to find a relationship with the user's stored information in the server computer. Once a relationship is found, the server implements steps of: locating at least one content that is related to the user's stored information; rendering the related content with the requested content; sending a content page to be displayed by the client device operated by the user; and upon income generation by the user interaction with advertising, or purchasing goods and services for sale, etc. on the content page, a commission may be paid to the user owning the information.

An alternative preferred method is implemented by a computer, which may be a server or other device with networking capability. This method is applicable when content is related to a content page that was requested by the user based on a relationship between the content and the user's stored information in the computer. For instance, the user's stored information relates to songs the user has downloaded from a musician and the content is an advertising promoting the musician's tour.

This alternative method is a novel way of presenting content to a user that is based on the user's stored information in the computer, since employing the method will remind the user of activities that are of interest to the user while the user is viewing a content page that may have no relationship with the user's stored information. Relating content based on the user's stored information or user's prior activities is new. The user's stored information may reside at the server serving the related content, in any user's personal device, or even in another server not associated with the server serving the related content. If based on the user's personal device, the server, for example, sending the related content may access the user's personal device at any time to index the user's stored information or to target content to the client device as described herein. If the server accesses the client device to send content to the client device then the content may be directed to another content that is being viewed using the device.

Figure 22:
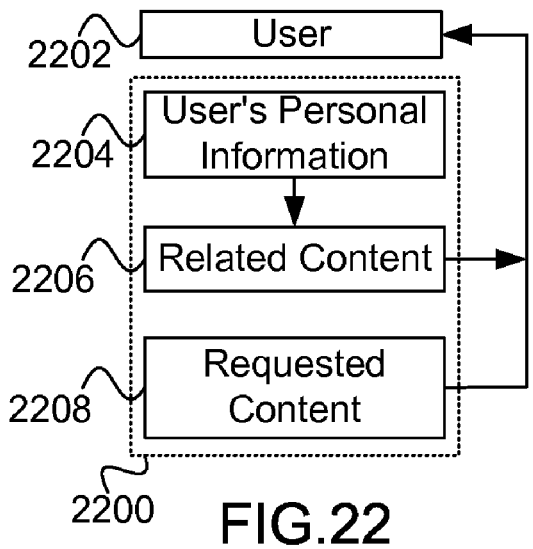
FIG. 22 illustrates the step of targeting content to a user based on the user's personal information.

FIG. 22 illustrates a preferred method using a FIG. 22 server (2200). The FIG. 22 server (2200) may be any kind of hosting computer, such as a user's personal device including laptop, desktop, personal phone, and any kind of mobile and non-mobile device. The FIG. 22 server (2200) may be located in a cloud.

The FIG. 22 server (2200) hosts or stores thereon FIG. 22 User's Personal Information (2204). The FIG. 22 User's Personal Information (2204) is used by the FIG. 22 server (2200)

to relate FIG. 22 Related Content (2206) to a FIG. 22 User (2202) once the FIG. 22 User (2202) requests content from the FIG. 22 server (2200). Upon request of the FIG. 22 User (2202), the FIG. 22 server (2200) fetches FIG. 22 Requested Content (2208) and uses the relationship between the FIG. 22 Related Content (2206) and the FIG. 22 User's Personal Information (2204) to send the FIG. 22 Related Content (2206) with the FIG. 22 Requested Content (2208) to the FIG. 22 user (2202).

Paying a Plurality of Content Providers for Providing Contents to a Single Content Page An alternative method is used when there is a plurality of content providers in an environment, such as a social network or micro-blogging site, which receives a commission based on the paid content that is advertised, or good sold and associated with a non-paid content page that includes contents from a plurality of users. The method enables each user of the content page to receive a commission for the income generated through user interaction with the content page. The paid-content may be just displayed on the non-paid content page or the paid content may have an association with other non-paid content, or have an association with private data of one or more users contributing to the non-paid content page. The private data may be user's personal information or user's content stored in the user's personal device.

The method may be implemented in websites like social network, micro-blogging sites, blogging sites or any hosting environment where more than one user contributes to a content page. A social network site is used herein as an example. In a social network, more than one user provides data that is consumed by a client device. The contents typically include: comments on another user's page, shared photos, shared links, etc. If user-a shares a link, user-b shares a photo and user-c shares a comment, then all three users are responsible for the income generated by the social network website and the method enables income generated by the social network website on the content page that was contributed by three users to be shared with the three users.

The process of relating second contents to the plurality of content contributors for a requested content page may be any method described herein or it may be any method used to relate content to a content page. In the case of a link, the server may initiate the steps of: accessing the destination of the user-supplied link; retrieving a content page at the destination; identifying objects within the retrieved content page; associating other content in any manner described in this disclosure or in any manner of relating a second object with any identified object within the retrieved content page to a user-requested content page. Other methods of associating second content may be used, such as described elsewhere in this disclosure. For instance, relating content to be rendered in the content page and the second content based on profiling information of one or more of the content contributors to the requested content page.

When the server retrieves content associated with a user's supplied link, the server may save the object within the retrieved content or the server may save the content. Saving may be in a database controlled by the server, which permits instant access to the stored objects. The stored objects may be used at any time to facilitate a search for related contents stored on the server. The stored objects may be used at any time a user's search request is received by the server computer, in this situation, the server may supply the complete content that was fetched based on the user supplied link, or the server may only supply the user's supplied link as part of the page search result.

The user's supplied link may be employed by the server computer for: indexing the content identified by the user's supplied link; retrieving one or more objects at the destination of the user's supplied link; forming a search engine using the one or more objects. When multiple user's supplied links are used in this way, it forms a better method to identify quality contents because they were suggested by users. Users' suggested contents better reflect a search result than if the contents are simply fetched by a search engine without regard for content quality. The objects of the users' supplied link may be related to one or more user's profile, profile of the user who suggested the content's link or the group of users who suggested a plurality of contents' links. The association of one or more user's profile with the users' supplied content link may be used to target other contents to the content page search result using any method that offers a search result based on user's supplied content's link.

The code to implement the method is preferably stored in a non-transient storage medium on a server computer. Once the method is processed by the server computer the method enables a plurality of users to provide content to be displayed on a content page. The server computer implements a step of receiving a request for the content page, which is the requested content page. The requested content page includes a plurality of contents provided by the plurality of users of the server computer. The server computer implements steps of: finding an association between an object or content on the requested content page and at least one other paid content or non-paid content (associated content); rendering (displaying to the user who sent the request) the associated content in the requested content page; and, if the any compensation is received for the user's interaction with the associated content, paying a commission (portion of the compensation) to the plurality of users who provided content to be displayed on the content page.

When the method utilizes a user-supplied link to content, the user-supplied link is preferably stored in a server computer. The server computer implements steps of fetching the content, which comprises objects such as text, images, etc.; processing the objects to identify them; identifying second content having a relationship with at least one object from the fetched content; and, transmitting the second content to be displayed on a client device.

Figure 23:
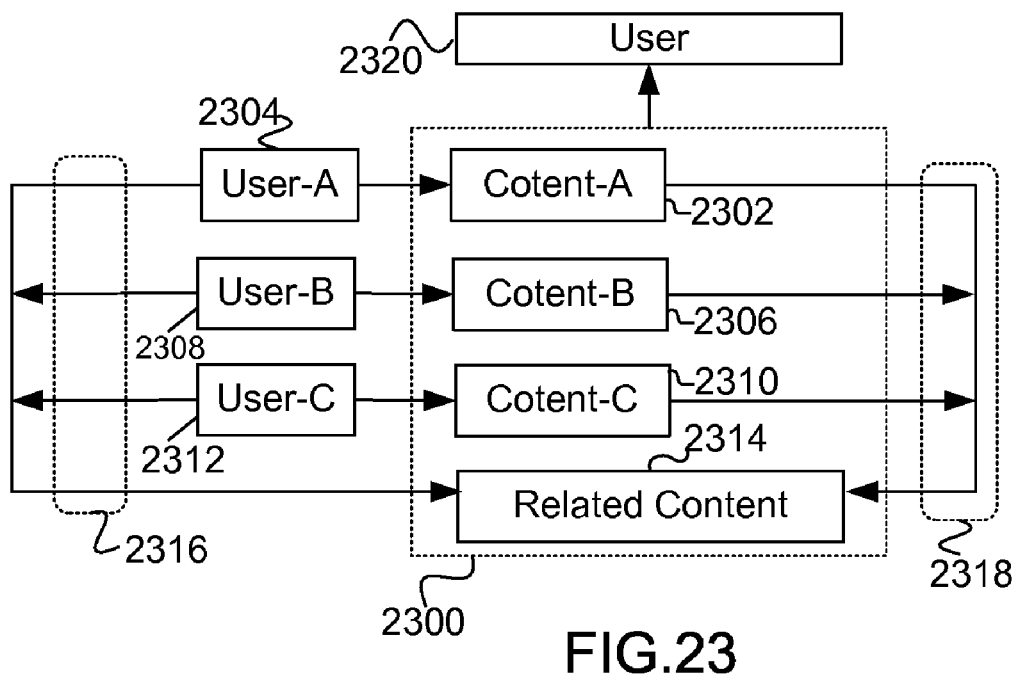
FIG. 23 illustrates the step of targeting content based on a content page having contents provided by multiple content providers.

FIG. 23 illustrates a FIG. 23 webpage (2300) comprising three objects supplied by three users: FIG. 23 Content-A (2302) supplied by FIG. 23 User-A (2304): FIG. 23 Content-B (2306) supplied by FIG. 23 User-B (2308); and FIG. 23 Content-C (2310) supplied by FIG. 23 User-C (2312).

FIG. 23 webpage (2300) further comprises FIG. 23 Related Content (2314) having an association with the objects of FIG. 23 webpage page (2300) based on a FIG. 23 relationship (2316) between the three users (user's profiling data (not shown)), who are content contributors. The association with the objects of FIG. 23 webpage page (2300) may alternatively or in addition be based on a FIG. 23 second relationship (2318) with the objects of the three supplied contents by the three users. FIG. 23 Related Content (2314) may have both such relationships simultaneously or may be based on just one relationship. The relationship may be of any kind of relationship.

Targeting Content to a User Based on the User's Acquaintances

An alternative preferred method is used when targeting content to a user based on the user's acquaintance (friends on a social network, or a follower in a micro-blog site, or contents on an address-book, etc.) The method includes steps of: targeting content to a user based on something involving one or more of the user's acquaintances. For example, this something may include: user-acquaintance preferences; a user-acquaintance prior visited content page; a user-acquaintance prior good or service purchased; a user-acquaintance prior clicked advertisement; any other user-acquaintance descriptor that correlates one user to another user. Once income is generated by the user interacting with paid-content, then a commission (portion of) in payment of the generated income may be paid to the user and/or to the user's acquaintance.

As an example, a user visits a website (requests a page) related to travel and one or more of his acquaintances on a social network site has travel as a hobby listed in their profile. One of such acquaintances may have visited New York. The server will implement steps of: targeting (identifying) related content, such as an advertisement, a service or a good for sale that is related to travel and to New York based on: the classification of the website as travel (or the content's object of the visited page); the user-acquaintance's profiling data which has travel; and New York that offers a relationship to the content page. The server renders (sends to the user for display) the related content in the website or page requested by the user.

A preferred method is used for relating content to a user. It is based on the user-acquaintance's data. The code implementing the method is preferably stored in a non-transient medium in a server computer. The method includes steps of: receiving a request for a content page from a registered user at the server computer; the server computer accessing one or more of the registered user's acquaintance's data; using the data to find a relationship between the data and a content; rendering the content in a page; transmitting the page to be displayed by a client device; and, optionally finding an association between the requested content, the user-acquaintance's data and at least one other content.

Figure 24:
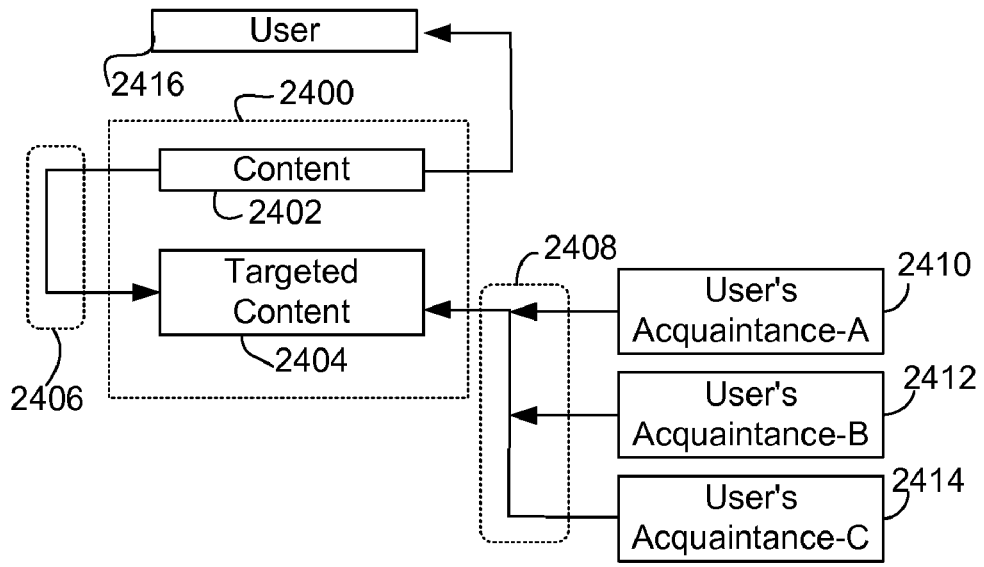
FIG. 24 illustrates the step of targeting content to a user based on the user's acquaintance's personal information.

FIG. 24 illustrates a FIG. 24 content page (2400) comprising FIG. 24 Content (2402) and FIG. 24 Targeted Content (2404). FIG. 24 Targeted Content (2404) is related to FIG. 24 Content (2402) based on a FIG. 24 relationship (2406) between FIG. 24 Content (2402) and the FIG. 24 Targeted Content (2404). The FIG. 24 relationship (2406) can be any kind, such as the use of the objects in the FIG. 24 Content (2402) to derive the relationship.

FIG. 24 Targeted Content (2404) may be associated with FIG. 24 Content (2402) based on a FIG. 24 relationship (2408), which is based on the FIG. 24 user (2416) acquaintances' information data, and the data may be of any data type. Once the server receives a content request for FIG. 24 Content (2402) from the FIG. 24 user (2416), the server retrieves FIG. 24 Targeted Content (2404) based on one or both of the FIG. 24 relationship (2406) and the FIG. 24 relationship (2408). If the server uses only the FIG. 24 relationship (2408) the server will fetch information from one or more of the FIG. 24 user (2416) acquaintances including: FIG. 24 User's Acquaintances-A (2410), FIG. 24 User's Acquaintances-B (2412), and FIG. 24 User's Acquaintances-C (2414). The server may use any number of the FIG. 24 user (2416) acquaintances in term to determine the FIG. 24 relationship (2408) to target (identify and send) the FIG. 24 Targeted Content (2404) to the FIG. 24 user (2416). The server may employ one or both relationships.

Broadcasting a Virtual Content to a Secondary User

A preferred method is used for presenting content in virtual form to a first user (user-a) after a second user (user-b) of a website adds the content to a server hosting the website. This method enables the presentation of content to a broad user base, such as in emergency situations where a message needs to be available to a broad base of recipients on a short notice. For instance, user-a adds content-a to user-a's hosting environment (website, social network, micro-blogging, blogging, etc.) and user-b chooses to host user-a's content-a and content-a becomes available to user-b's hosting environment. A third user user-c may select to accept any of selected content from user-b. Now content-a will be available to user-c even though user-c hasn't chosen content-a. Content-a is available to user-c through the connection between user-c and user-b.

Figure 25:
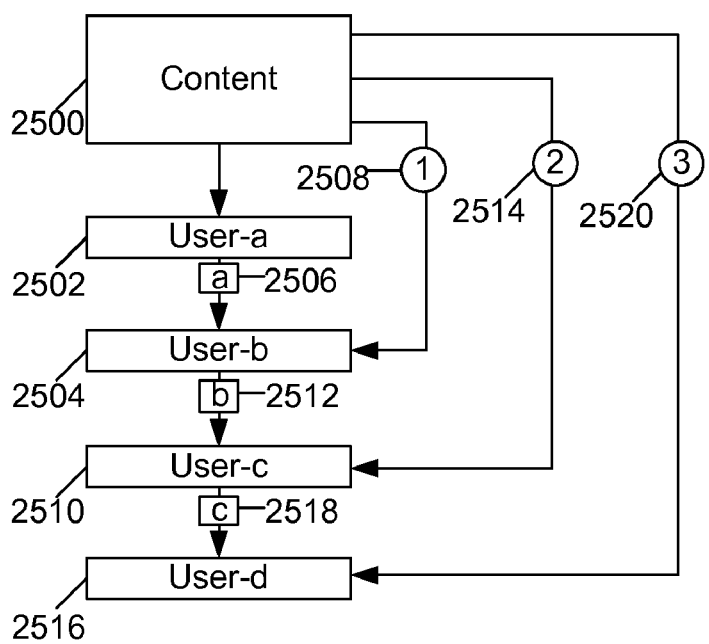
FIG. 25 illustrates the step of enabling content from one user to be propagated to another user based on the other user's election to receive the content.

FIG. 25 illustrates this method. FIG. 25 Content (2500) is associated to FIG. 25 User-a (2502). FIG. 25 Content (2500) is available to any user accessing FIG. 25 User-a's (2502) webpage. Any other user may link to FIG. 25 User-a (2502) as to FIG. 25 inherit Content (2500) from FIG. 25 User-a (2502) hosting site and present the content as if the content was hosted at the inheriting user's hosting environment. Users may FIG. 25 inherit Content (2500) from FIG. 25 User-a (2502) by choosing FIG. 25 Content (2500) from the hosting environment of FIG. 25 User-a (2502) or by choosing to automatically accept contents from FIG. 25 User-a (2502) like following FIG. 25 User-a (2502), this process is called criteria. For instance, FIG. 25 User-b (2504) may choose to accept any content or selected content based on any selection criteria from FIG. 25 User-a (2502).

If FIG. 25 User-b (2504) elects to receive content from FIG. 25 User-a (2502) by choosing a criteria (2506), then FIG. 25 Content (2500) is FIG. 25 available (2508) to FIG. 25 User-b (2504).

If FIG. 25 User-c (2510) chooses to receive content from FIG. 25 User-b (2504) based on FIG. 25 criteria (2512), then FIG. 25 Content (2500) is FIG. 25 available (2514) to FIG. 25 User-c (2510) based on FIG. 25 criteria (2512) which enables FIG. 25 User-c (2510) to receive FIG. 25 Content (2500) through FIG. 25 User-b (2504).

If FIG. 25 User-d (2516) decides to receive content from FIG. 25 User-c (2510) by choosing FIG. 25 criteria (2518) then FIG. 25 Content (2500) becomes FIG. 25 available (2520) to FIG. 25 User-d (2516) through FIG. 25 User-c (2510), through FIG. 25 User-b (2504) and through FIG. 25 User-a (2502).

FIG. 25 User-a (2502) is the first user in the chain of users. FIG. 25 User-a (2502) is the owner of Content (2500). FIG. 25 User-b (2504) is the first propagator of FIG. 25 Content (2500) to FIG. 25 User-b (2504) associated acquaintances. FIG. 25 User-c (2510) is the second propagator. FIG. 25 User-d (2516) is the third and last propagator of Content (2500).

For example, the server may implement a step of enabling a third user (user-c), who is associated with the second user (user-b), to elect to receive selected contents from the second user (user-b) automatically, that is, once the second user (user-b) places (adds) the content. The server will enable the third user (user-c) to have the content displayed automatically on the third user's profile based on the third user's election to accept the content from the second user (user-b). The third user (user-c) may elect to accept all contents that the second user (user-b) places on the second user's profile or the third user (user-c) may elect to receive content related to a specific category, sub-category, classification, etc. from the second user (user-b).

This method is preferably used for websites that enable a first user to see the content of second user. In this kind of website, the second user may elect to accept content provided by the first user. For instance, in the prior example, if user-b is a follower of user-a, then any time user-a places a content into user-a's profile, user-b automatically has access to the content based on a set parameter that designates user-b as a follower of user-a.

If user-c elects to receive content from user-b (content posted by user-b or content received by user-b from other users), then user-c will have the content that was posted by user-a based on the preset election of user-c to receive content from user-b. Even though user-c is not associated with user-a in any form. The election from user-c to accept content from user-b creates an automatic link between user-c and user-a based on user-c's election to receive content from user-b. Alternatively, User-c may elect to accept only contents posted by user-b; user-c may elect to accept only contents posted by user-b based on a specific classification; user-c may elect to accept only contents posted by a third user which user-b follows; or user-c may elect to receive contents from the third user user-b follows and based on a specific classification, like: emergency, family, party, travel, hints, etc. User-c may elect to receive content base on any combination of the just described election alternatives.

The method may include optional steps of detecting a situation where a dead-loop occurs and stopping the dead loop. A dead loop is an infinite loop of code steps, or more accurately a sequence of instructions in a computer program which loops endlessly, either due to the loop having no terminating condition, having one that can never be met, or one that causes the loop to start over. This may occur when user-c elects to automatically receive a message from user-b; user-b elects to automatically receive a message from user-a; and user-a elects to automatic receive message from user-c. A message from user-a will be posted to user-b and user-c then back to user-a, thus forming a dead-loop that may be continuously repeated. If a dead loop is formed it may cause the server to lock up or crash.

The method may be implemented where a fourth user (user-d) receives a message that was transmitted by user-a. For instance, user-d elects to receive messages from user-c that was received from any user associated with user-d. As we already know, user-c receives message from user-a based in the election of user-c to accept messages from other users through user-b. Now if user-d elects to receive virtual messages, that is a message received through another user, user-b in this case, then user-d will also receive the message from user-a based on a link between user-c and user-b, and, a link between user-b and user-a. If the user-d elects to receive message that has a connection with user-c, this will allow user-d to receive message from user-b based on the link between user-d and user-c, but user-d will not be able to receive message from user-a because user-d has only elected to receive message one level of propagation. So a user may elect to receive a message that has no limit of propagation (broadcasting level), a user may elect to receive message that has only one level of propagation or a user may elect to receive message that has x level of propagation, that is, the user sets the number of levels of a message propagation, the larger the value the more messages the user will receive, the smaller the value, the fewer messages the user will receive. The user may set, reset or change the level of message propagation at any time so as to change the scope of propagation and the number of messages to receive.

An example of the method is a computer implements steps of: associating a first user with a second user; associating a third user with the second user; enabling the third user to elect to receive messages from the second user; accepting a message from the first user; placing the message in the profile of the first user; displaying the message in the second user's profile based on the association between the first user and the second user; displaying the message in the third user's profile based on the election of the third user to receive messages from the second user; optionally enabling a fourth user to elect to receive messages from the third user; optionally displaying the message in the fourth user's profile based on the election from the fourth user to receive message from the third user; optionally, preventing a dead-loop while processing the message's propagation; and optionally, allowing a user to set the level of a message's propagation.

A paid content may be targeted to the user's supplied content as well or be target to the virtual propagated message. The paid content may be targeted based on a relationship, like: a relationship between the user's supplied content and the paid content (using any of the means already described in this disclosure); a relationship between the paid content and one or more of user's data (personal profiling data, personal provided information, personal hobby, etc.) participating in the message propagation or the message provider; a relationship between the paid content and a combination of the users' data (one or more user that will consume the content) that the user supplied content is displayed to; a relationship between the combination of users' data and the user-supplied content's objects; any other type of combination between the paid content, the user's supplied content, and one or more of the users' data; or any other type of combination that allows the system to target the paid content to one or more users.

The methods described herein are preferably implemented with a step of paying a commission to each participant that helps to generate an income stream. When non-paid content is associated with multiple users, each user supplying the non paid content may receive a higher commission, since the non-paid content will be displayed to the multiple users. Thus, the method may include a step of compensating each user, including the content provider and those intermediary users receiving propagated messages up to the user doing the interaction. Each such user may receive a commission based on the generated income.

Alternatively, the user appearing higher in the propagation chain may receive a higher commission and a user appearing lower in the propagation chain gets a lower commission, or vice-verse. For instance, user-a will get a higher commission than user-b, user-b will get a higher commission than user-c, and user-c will get a higher commission than user-d, or vice-verse. Alternatively, user-a may get a commission for all the users in the chain; user-b may get a commission for all user in the chain except for interaction of user-a; and user-d may only get a commission for interaction with displayed content.

Selected criteria may be turned off or be changed to different criteria at any time by a user, if the criteria are turned off then no content from another user will be available to the user. The criteria may be like choosing to accept all contents from a specific user or form a group of users, it may be based on a particular content classification form a specific user or from a group of users, it may be based on specific hobby from one or more users, it may be based on specific paid content classification viewed and/or interacted by one or more users, it may be based on data from one or more user's profiles, or it may be based on any conceivable means to set a criteria for the purpose of choosing to accept a content from one or more users.

The method may be implemented on a computer and include steps of: registering a first user, a second user and a third user; storing data related to the first user, the second user and the third user in a non-transient medium on the computer; hosting first-user content; associating the first-user content with the first user; permitting the second user to elect to receive the first-user content according to a first criteria; making the first-user content available to the second user according to the first criteria, essentially converting first-user content to second-user content; enabling the third user to elect to receive the second-user content according to a second criteria to accept second-user content from the second user. This last step, thus makes first-user content available to the third user as second-user content, essentially converting second-user content to third-user content. This conversion may be thought of as associating the content with other users.

Presentation and the display of content, whether an object, text, a message, or a page, may be by transmission using any available medium. For example, a message may be transmitted as message to be displayed or consumed by portable devices like a cell phone, a personal pad or any personal device working on a wireless communication medium or any other communication medium like a hardwired communication lines in a telephone or computer network. The implementation may be based on downloading a program to portable device, or may be a combination of portable and non-portable device and a combination of online and off line devices.

Although the methods have advantages as described herein, it should be understood that various changes, substitutions and alterations could be made herein without departing from the true spirit and scope of the invention as defined by the appended claims. Moreover, the scope of the present application is not intended to be limited to the particular embodiments of the process, machine, manufacture, composition of matter, means, methods, computer software and steps described in the specification. As one of ordinary skill in the art will readily appreciate from the disclosure of the present invention, processes, machines, manufacture, compositions of matter, means, methods, computer software, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, computer software or steps.

What is claimed is:

1. A method of web site development based on advertising revenue sharing, comprising the steps of:
    receiving paid content from an advertiser;
    receiving non-paid content from a provider subject to a condition that the provider may receive no compensation for the non-paid content;
    combining the paid content and the non-paid content on a content page;
    registering a user to interact with the content page;
    sending the content page for display on a computer operated by the user;
    calculating a number equaling all interactions of the user with the paid content;
    receiving payment from the advertiser for said number; and
    paying the provider based on a fraction of the payment.

2. The method according to claim 1, further comprising the step of enabling the user to suggest paid content that is related to the non-paid content.

3. The method according to claim 1, further comprising the step of setting a maximum number of times that paid content can be displayed to the user.

4. The method according to claim 1, further comprising the step of paying said user for revenues generated by said interactions.

5. The method according to claim 1, further comprising the step of setting a minimum time period which must elapse before redisplaying a previously displayed advertising on the content page to the user.

6. A method of web site development based on advertising revenue sharing, comprising the steps of:
    registering a provider to prepare free content subject to a condition that the provider may receive no compensation for the free content;
    receiving paid content;
    combining the free content with the paid content on a content page;
    sending the content page for display on a computer;
    enabling a user to access the computer and display the content page;
    calculating a gross total of times the user displays the content page;
    determining a net total by subtracting from the gross total the number of subsequent times the user accesses the content page before expiration of a waiting-time threshold from an immediately preceding access;
    receiving payment from the advertiser for the net total; and
    paying the provider for the net total.

7. A method of web site development based on advertising revenue sharing, comprising the steps of:
    providing a server computer;
    combining content with an advertisement;
    sending the content and advertisement to a user accessing the server computer;
    receiving at the server computer a first click on the advertisement, the first click sent by the user;
    saving a first indication of receiving the first click;
    receiving a second click on the advertisement, the second click sent by the user;
    setting a time period;
    determining if the second click is received after expiration of the time period;
    saving a second indication of the second click if the second click occurs after expiration of the time period; and
    charging an advertiser for each saved indication.

8. The method according to claim 7, further comprising the steps of:
    providing a clickable link to paid content from a content distributor on the server computer; and
    paying the content distributor for each click on the clickable link to the paid content.

9. The method according to claim 8, further comprising the steps of:
    receiving the content from a provider subject to a condition that the provider may receive no compensation for the content; and
    paying the provider for each click on the clickable link to the paid content.

10. A method of host development based on advertising revenue sharing, comprising the steps of:
    registering a provider to prepare non-paid content subject to a condition that the provider may receive no compensation for the non-paid content;
    transmitting the non-paid content to a content distributor;
    receiving at a host:
        the non-paid content sent by the content distributor; and
        paid content from an advertiser, the paid content comprising a link to additional information;
    combining the non-paid content and the paid content into a page;
    displaying the page on the host;
    totaling a number of interactions by a user with the link;
    receiving payment from the advertiser for the number of interactions with the link; and
    paying the provider for the number of interactions with the link.

11. The method according to claim 10, further comprising the step of paying the content distributor for the number of interactions with the link.

12. The method according to claim 10, further comprising the step of incorporating the non-paid content into the page as virtual content.

13. A method of host development based on advertising revenue sharing, comprising the steps of:
- registering a provider to prepare non-paid content subject to a condition that the provider may receive no compensation for the non-paid content;
- transmitting the non-paid content to a content distributor;
- receiving at a host:
  - the non-paid content sent by the content distributor; and
  - paid content from an advertiser;
- combining the non-paid content and the paid content into a content page;
- displaying the content page on the host;
- totaling a number of times a user displays the content page;
- receiving payment from the advertiser for the number of times the user displayed the content page; and
- paying the provider for the number of times the user displayed the content page.

14. The method according to claim 13, further comprising the step of paying the content distributor for the number of times the user displayed the content page.

15. The method according to claim 13, further comprising the step of incorporating the non-paid content into the page as virtual content.

16. A method of host development based on advertising revenue sharing, comprising the steps of:
- registering a provider to prepare non-paid content subject to a condition that the provider may receive no compensation for the non-paid content;
- transmitting the non-paid content to a content distributor;
- receiving at a host:
  - the non-paid content sent by the content distributor; and
  - paid content from an advertiser;
- combining the non-paid content and the paid content into a content page;
- displaying the content page on the host;
- totaling a number of times a user interacts the content page;
- receiving payment from the advertiser for the number of times the user interacts with the content page; and
- paying the host for the number of times the user interacted with the content page.

17. The method according to claim 16, further comprising the step of paying the content distributor for the number of times the user interacted the content page.

18. The method according to claim 16, further comprising the step of incorporating the non-paid content into the page as virtual content.

19. The method according to claim 16, wherein the interaction is selected from a group of one or more of: a click on the paid content; and, a view of the paid content.

\* \* \* \* \*